US009314748B1

(12) United States Patent
MacLean-Blevins

(10) Patent No.: US 9,314,748 B1
(45) Date of Patent: Apr. 19, 2016

(54) SYSTEM AND METHOD FOR DISPENSING AND AERATION OF A BEVERAGE

(71) Applicant: Mark MacLean-Blevins, Westminster, MD (US)

(72) Inventor: Mark MacLean-Blevins, Westminster, MD (US)

( * ) Notice: Subject to any disclaimer, the term of this patent is extended or adjusted under 35 U.S.C. 154(b) by 0 days.

(21) Appl. No.: 13/911,647

(22) Filed: Jun. 6, 2013

Related U.S. Application Data

(60) Provisional application No. 61/657,510, filed on Jun. 8, 2012.

(51) Int. Cl.
*A47J 31/00* (2006.01)
*B01F 3/04* (2006.01)

(52) U.S. Cl.
CPC .................................. *B01F 3/04787* (2013.01)

(58) Field of Classification Search
CPC .................................................... B01F 3/04787
USPC .......... 222/166, 479, 500, 567; 248/141, 133, 248/138, 142, 103, 106, 313, 105, 205.2, 248/222.52, 222.11; 426/590, 474; 99/495
See application file for complete search history.

(56) References Cited

U.S. PATENT DOCUMENTS 2,731,172 A 1/1956 Alvistur
3,868,047 A 2/1975 Bersano
5,026,480 A 6/1991 Fischer
5,040,437 A * 8/1991 Mueller ........................... 81/3.2
5,704,505 A * 1/1998 Singh ............................ 215/397
5,950,831 A 9/1999 Millet
6,174,066 B1 1/2001 Vinding-Diers
6,275,287 B1 * 8/2001 Watanabe ................. 356/239.4
6,409,374 B1 6/2002 Willat
6,568,660 B1 5/2003 Flanbaum
7,300,580 B2 11/2007 Lindsey et al.
D569,693 S 5/2008 Zell
7,407,301 B2 8/2008 Zell
7,519,263 B2 4/2009 Richards
7,708,241 B2 5/2010 Wiemholt
7,975,872 B2 7/2011 Lardino
8,205,541 B2 6/2012 Barberio et al.
2006/0283882 A1 12/2006 Escobar et al.
2007/0210109 A1 * 9/2007 Wiemholt ..................... 222/166
2007/0295761 A1 12/2007 Simons
2008/0282908 A1 * 11/2008 Cole et al. ........................ 99/495
2010/0091605 A1 4/2010 Rasmussen et al.
2011/0154994 A1 6/2011 Sabadicci
2011/0271846 A1 11/2011 Hynes
2012/0012718 A1 1/2012 Tiso
2012/0031915 A1 2/2012 Hewison
2012/0056339 A1 3/2012 Chiorazzi et al.

* cited by examiner

*Primary Examiner* — Phuong Nguyen
(74) *Attorney, Agent, or Firm* — Rosenberg, Klein & Lee

(57) ABSTRACT

An apparatus and method are provided for dispensing and aerating a beverage such as fine wine that has undergone long term bottle aging. The apparatus provides an elevated illuminated cradle upon which the bottle neck can be rested during dispensing of the beverage into a decanting vessel. Illumination is directed through the neck of the bottle to enable a user to detect the onset of the presence of sediment and then halt the dispensing process. The apparatus includes a removable flow channel portion with a downwardly inclined flow channel populated with protuberances to cause the beverage flowing thereon to cascade turbulently over the protuberances and thereby provide ample aeration as the beverage flows down the flow channel to the decanting vessel for collection. The flow channel portion further includes a removable filter to prevent any inadvertent passage of sediment from reaching the decanting vessel.

19 Claims, 26 Drawing Sheets

SYSTEM AND METHOD FOR DISPENSING AND AERATION OF A BEVERAGE

REFERENCE TO RELATED APPLICATION

This Application is based on Provisional Application 61/657,510, filed 8 Jun. 2012, currently pending.

BACKGROUND OF THE INVENTION

Fine wine is produced and bottled globally in standard 750 ml and 1500 ml glass bottles of various shapes and styles. The process of making wine includes steps of gathering the fruit, preparing the fruit, pressing and extracting the juice from the fruit, fermenting the juice and then storing the fermented juice for some extended time prior to bottling. Most often the wine is stored in oak barrels during this extended storage time prior to bottling. Winemakers use this time to continuously taste the wine as it ages to determine when it is ready for bottling and sometimes to determine which barrels to blend together for a final wine product.

With many inexpensive, large production wines, a stabilizer additive is used to provide protection against oxidation and to extend the shelf-life of the wine once it is uncorked by the end user. Most all of these large production wines are meant for immediate consumption by the consumer—that is, once the bottle is purchased from the local wine merchant it is most often consumed within 48 hours of purchase. As such, the wine is filtered and goes through a process called fining whereby certain additives are used to accelerate the precipitate formation prior to filtration. This provides a bottled wine that will contain no sediment from the wine creation and aging processes—wine ready to drink.

Most fine wines, those from rare vineyards or from top rated winemakers are bottled directly from the barrel with little or no additives and without the fining process. These wines are produced, barrel aged then bottled, but are not quite ready to consume just yet, as most will need additional aging time in the bottle to reach their peak flavor and texture or mouth feel. Many consumers of these fine wines will purchase these and store them in their cellars for years waiting for the best time to consume these wines.

With bottle aging the wines will throw off a precipitate that will collect in the bottle in the form of sediment. Throughout history many different sediment avoidance measures have been created to help extract the precious fine wine without dispensing any of the accumulated sediment. Most often the wine will be stored in bottle with the bottle lying on its side to allow the cork to remain wetted by the wine. This prevents the cork from drying out and allowing oxygen to penetrate and oxidize the wine. As a result of storage on the bottle side, the sediment will form on one side of the bottle, as gravity pulls the heavier sediment downward. When planning to consume a particular bottle of wine, the wine is pulled from the cellar and set upright for a day or so prior to opening, thus allowing the sediment to migrate to the bottom of the bottle.

Now ready to open the wine, the bottle is uncorked carefully and the wine is dispensed from the bottle into another container called a decanter. The user slowly pours the wine into the decanter watching carefully through the glass bottle neck for the sediment to arrive. As the bottle begins to get near to empty the sediment will begin to mix with and pour with the wine. As soon as the pourer sees the sediment reach the bottle neck the pour is discontinued. The wine transferred into the decanter should be clear and free of any residual sediment and ready to consume. In many instances, the pourer will pour over top of a candle, using the light to help see through the glass neck, which is often formed of a dark colored glass and difficult to see through in low light situations.

Another benefit of moving the wine from the bottle into a decanter container is that the process of pouring the wine causes it to stir and tumble allowing oxygen to get to the wine and open it up, or as commonly known, allow it to breathe. Most fine wine consumers will allow a wine some time to breathe before drinking—30 minutes or more in some cases. Additional agitation of the wine during decanting or once in the decanter can sometimes help to speed this process along, allowing the impatient consumer the ability to taste their wine without the wait. Indeed, several novel devices have been created to help speed this process, including venturi devices, spiral funnels, screened funnels and the like.

FIELD OF THE INVENTION

This disclosure is generally directed to the dispensing and aeration of liquid materials. More specifically, it is directed to a decorative, easy to use, intuitive and enjoyable, apparatus and method of aerating a liquid while dispensing into a decanter or glass.

An apparatus is disclosed to facilitate and allow a user to pour liquid from a storage container or bottle into a gravity induced flow path and into a decanter vessel or glass. Additionally, given use of the apparatus, a method for dispensing and preparing a liquid for consumption by a user is disclosed.

The apparatus is situated to allow the user to pour the liquid from a storage container or bottle onto a sloped gravity fed flow path containing structural features that provide a tumbling effect on the liquid flow, resulting in rapid oxygenation of the liquid. This flow path terminates with a drip-free pouring surface, situated at an elevated position, above the vessel to receive the prepared liquid. One can imagine this to be like water in a stream, tumbling over rocks and stones as it makes it way down the stream to the waterfall.

In addition, the apparatus will have a formed cradle for the bottle neck to rest against during pouring, helping the pourer to carefully raise the bottle during the pour. Within this neck cradle area there will be situated an illumination source that will provide focused light directly beneath the bottle neck and shoulder of the bottle to aid the pourer in seeing the approaching sediment during the pouring operation. This illumination source can be actuated by sensors within the neck cradle area, such that when the bottle neck is in position the illumination source is initiated. A timer circuit will be included to extinguish the illumination at some time interval after the bottle neck is removed from the cradle area, say after 15 seconds.

The apparatus is created to stand upon a table surface, providing an arrangement that allows the user easy access to the bottle neck and shoulder areas for seeing the liquid though the neck and shoulder as it is poured and allows sufficient vertical drop distance through the gravity induced flow path for adequate agitation and aeration of the wine. The dispensing surface is situated with enough vertical clearance from the table surface to accommodate a wineglass or decanter container.

Given an illumination source for assisting the pourer in seeing the sediment; and given the desire to make the apparatus stylish, fun and entertaining; the gravity induced flow path is seen as a crystal clear molded plastic component with the wine pouring side polished for easy cleaning and with the back side frosted so that it too could be illuminated—the frosted surface acting to diffuse the light to provide a gentle glow under the wine as it flows and tumbles downward over the structural elements molded into the flow path. The flow path is envisioned as a removable part that would be molded from a suitable dishwasher safe polymer, for example a PET copolymer such as Tritan by Eastman is suitable for the application. Light pipe technology can be utilized to provide the illumination disconnect when the flow path is removed for cleaning.

Again, given the desire for the device to be decorative and given an illumination source for the above features, it can be possible to provide a downward illumination of the decorative structural stand element of the device. The structural element may be a hollow clear tube, where the user is able to populate the inside of the tube with whatever they choose as a decorative element and the illumination source can illuminate the contents of the tube for providing an aesthetically pleasing effect.

Features to assist the user in pouring from the storage container or bottle are also provided, including: a cradle element for the bottle neck to rest upon during pouring; an illumination source within the cradle portion; a sediment capture filter screen element;

There exists, therefore, a need for an approach to dispensing a liquid beverage which provides the user an intuitive, easy and decorative apparatus to prepare the liquid for consumption by the user.

Numerous beverage aeration devices are found within the art and most in retail use today do an acceptable job of providing the proper aeration for preparing a beverage for consumption. Several aeration devices are also found with structural stand elements to assist in holding the aeration device at an elevated position above some decanter vessel. Some are designed to fit within the decanter vessel itself negating the need for any external structure. However, none of the currently available aeration devices, or those found in the art provide the hands free illumination to assist the user in detecting the sediment during the pouring operation. None of the aeration device of the current art provide a removable, dishwasher-safe flow channel. None of the devices found in the current art provide the illumination light-pipe disconnect between the removable flow channel and the illumination source. None of the available bottle illumination devices provide any additional decorative illumination benefits. None of the available bottle illumination devices provide the ability to also filter and aerate the beverage as it is being poured. Hence, there exists a need for a beverage dispensing, filtering and aeration device that also includes hands-free illumination and provide the ability to properly sanitize the flow channel after each use. The use of this system and method is intuitive and will aid in the enjoyment of preparing the beverage for consumption.

SUMMARY OF THE INVENTION

A system for dispensing and aerating a beverage is provided which includes an upper housing portion having a cradle configured for receiving a neck portion of a beverage container. The system further includes a longitudinally extended support member coupled to the upper housing portion on one end thereof for supporting the upper housing portion at an elevated position. Further, the system includes a flow channel portion removably coupled to the upper housing portion and disposed in aligned relationship with the cradle. The flow channel portion includes a downwardly inclined flow channel having a flow surface with a plurality of protuberances extending upwardly therefrom and spaced along a longitudinal flow path of the flow surface for creating a cascading turbulent flow of a beverage dispensed from the beverage container to provide aeration thereof.

From another aspect, a system for dispensing and aerating a beverage is provided that includes a support member extending upwardly from a support base and an illumination portion coupled to an upper end portion of the support member. The illumination portion includes an upper housing portion that has a cradle formed therein and configured for receiving a neck portion of a beverage container therein and at least one illumination source disposed within the upper housing portion and positioned for illuminating a flow of the beverage within the neck portion of the beverage container to enable a user to detect sediment in the flow. The system also includes a flow channel portion removably coupled to the upper housing portion and disposed in aligned relationship with the cradle. The flow channel portion includes a downwardly inclined flow channel having a flow surface with a plurality of protuberances extending upwardly therefrom and spaced along a longitudinal flow path of the flow surface for creating a cascading turbulent flow of a beverage dispensed from the beverage container to provide aeration thereof.

From yet another aspect, a method of decanting and aerating a beverage is provided that includes the step of providing an illuminated support at an elevation above a beverage receiving container. The method further includes providing the illuminated support with a downwardly inclined flow channel having a flow surface with a plurality of protuberances extending upwardly therefrom and spaced along a longitudinal flow path of the flow surface, and positioning a longitudinally extended neck portion of a beverage container on the illuminated support. Further, the method includes illuminating the neck portion of the beverage container with a light beam impinging a longitudinal portion of the neck portion of the beverage container and passing therethrough, and pouring a beverage from the beverage container onto the downwardly inclined flow channel and therefrom into the beverage receiving container, wherein flow of the beverage over the plurality of protuberances produces a cascading turbulent flow and thereby aerates the beverage. Still further, the method includes halting the pouring of the beverage from the beverage container responsive to visualization of sediment in the illuminated neck portion of the beverage container.

As is described herein, the system generally comprises an elevated removable flow channel, adjacent to an elevated housing having a cradle and containing the elements required to provide battery powered illumination as desired. This illumination housing has a cradle or saddle formed therein to allow the user the intuitive ability to rest the container neck on or within the cradle. This assists the user in stabilizing the container during the dispensing operation. The illumination source is disposed within the housing for emission in proximity to the cradle and initiated in response to sensing elements detecting the presence of the container neck. The sensing elements detect the presence of the bottle neck and trigger electronic circuits of a circuit board to initiate the illumination of the bottle neck and shoulder areas. Once the bottle neck is removed the sensors again trigger and initiate a short time delay until the illumination is ceased. For conservation of battery power the electronics require a single closure of the switch to power the sensor elements. Once powered the sensor elements will remain active for a predetermined time before entering a power save mode. The illumination is provided by one or more LED illumination sources which are connected to one or more lens elements that acts to direct and focus the illumination into a specific linear shape in the longitudinal direction of the neck of the bottle, directly under the neck and shoulder portions of the bottle, so that the user will see through the flow from the bottle to detect any sediment in the beverage during the dispensing operation. In addition, this or another lens element directs illumination to another surface which is adjacent to a light pipe formed by a structural element on the removable flow channel portion of the system. In this manner, illumination can be directed to the flow surface of the flow channel and provide gentle backlighting of the flow surface during the dispensing operation. The dispensing end of the flow channel portion of the system is at an elevation to allow a receiving container to easily be inserted and removed. This receiving container is often called a decanter and the dispensing process mentioned above is commonly called decanting. In addition to the purely function attributed of the disclosed apparatus as mentioned, there is a decorative attribute to the apparatus as well. The main tubular structure shown in the preferred embodiment can be manufactured from a clear material and can be filled with objects for decoration, for example, old corks, seashells, coins, dried flowers and the like. In one embodiment, additional illumination could be included to illuminate the interior of this structural component, either highlighting the decorative objects placed therein or to be used as an illumination source for accent lighting in the room in which the apparatus is situated.

The apparatus and system provide the ability to carry out the method of preparing a beverage for consumption after prolonged storage in a storage container or bottle. The method may include the steps of: preparing the bottle to be dispensed by removing it from storage and placing it in an upright condition for some suitable time prior to opening; the step of opening the bottle with care as the closure elements do degrade over time; the step of inserting a receiving vessel or decanter in position on the apparatus ready to receive the beverage; the step of placing the neck of the bottle into the cradle so as to carefully allow slow and measured pouring of the precious liquid from the storage bottle; the step of pouring the beverage from the bottle may include pouring the beverage through the removable filter element and over the flow surface; the step of carefully viewing the beverage through the bottle neck with the bottle neck shoulder areas being illuminated and watching for any sediment to flow with the beverage; and the step of ceasing the flow of the beverage from the bottle once the sediment is detected, thereby preventing sediment from entering the filter or the flow surface areas.

DETAILED DESCRIPTION OF THE PREFERRED EMBODIMENTS

Figure 1:
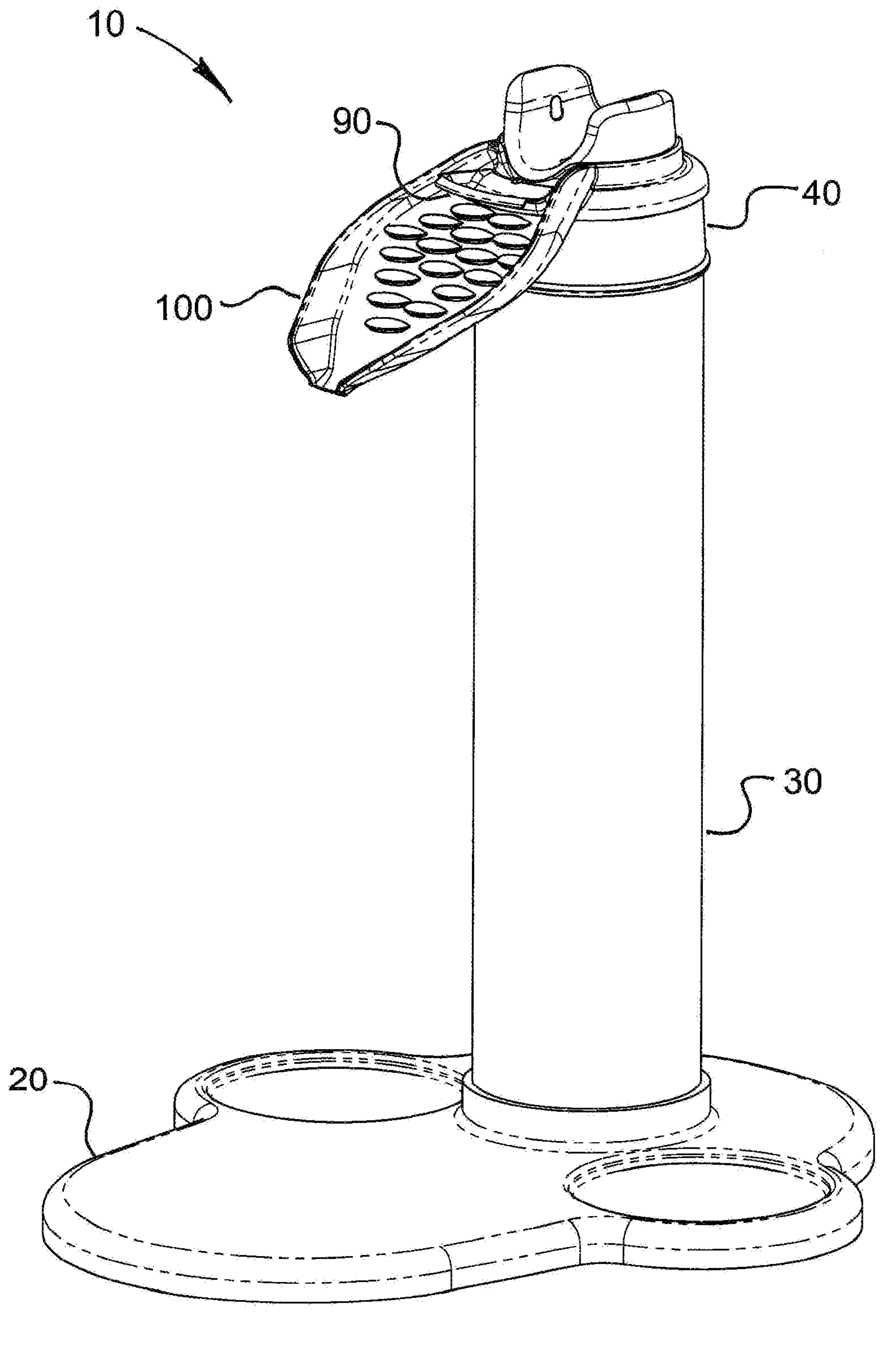
FIG. 1 is a front perspective exterior view of one embodiment of a system formed in accordance with the disclosed apparatus.
Figure 2:
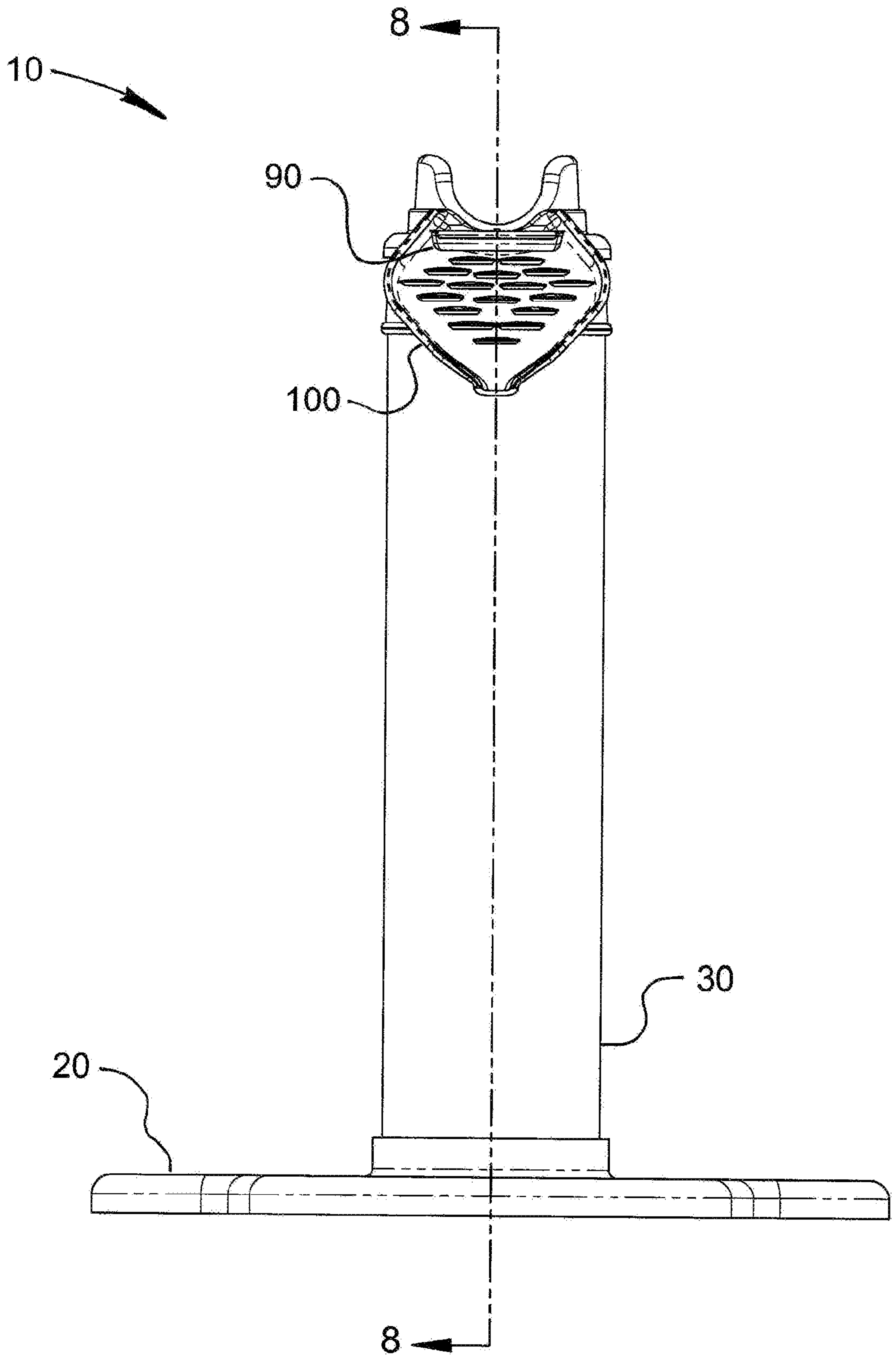
FIG. 2 is a front elevation view of the embodiment as illustrated in FIG. 1.
Figure 3:
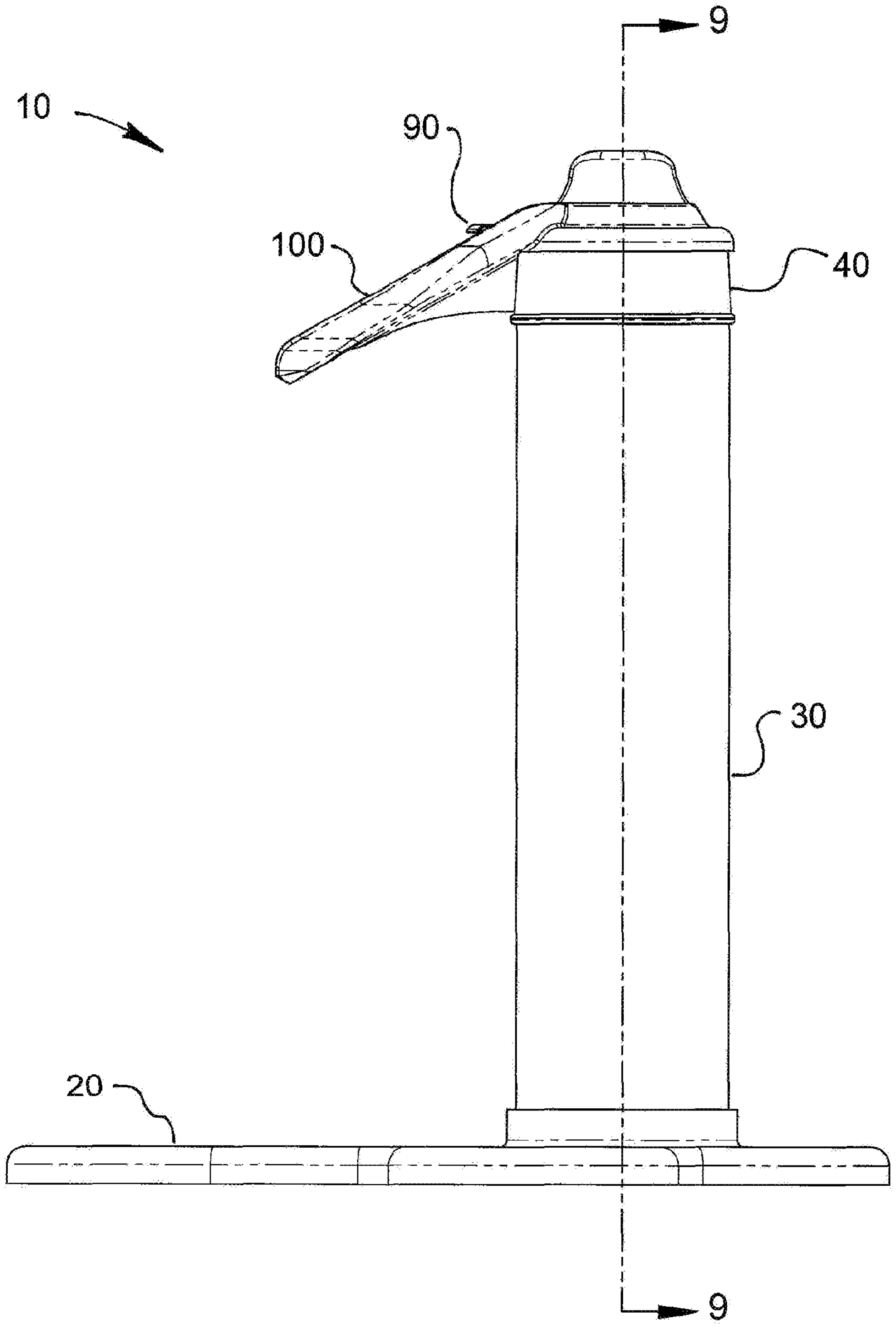
FIG. 3 is a right side elevation view of the embodiment as illustrated in FIG. 1.
Figure 4:
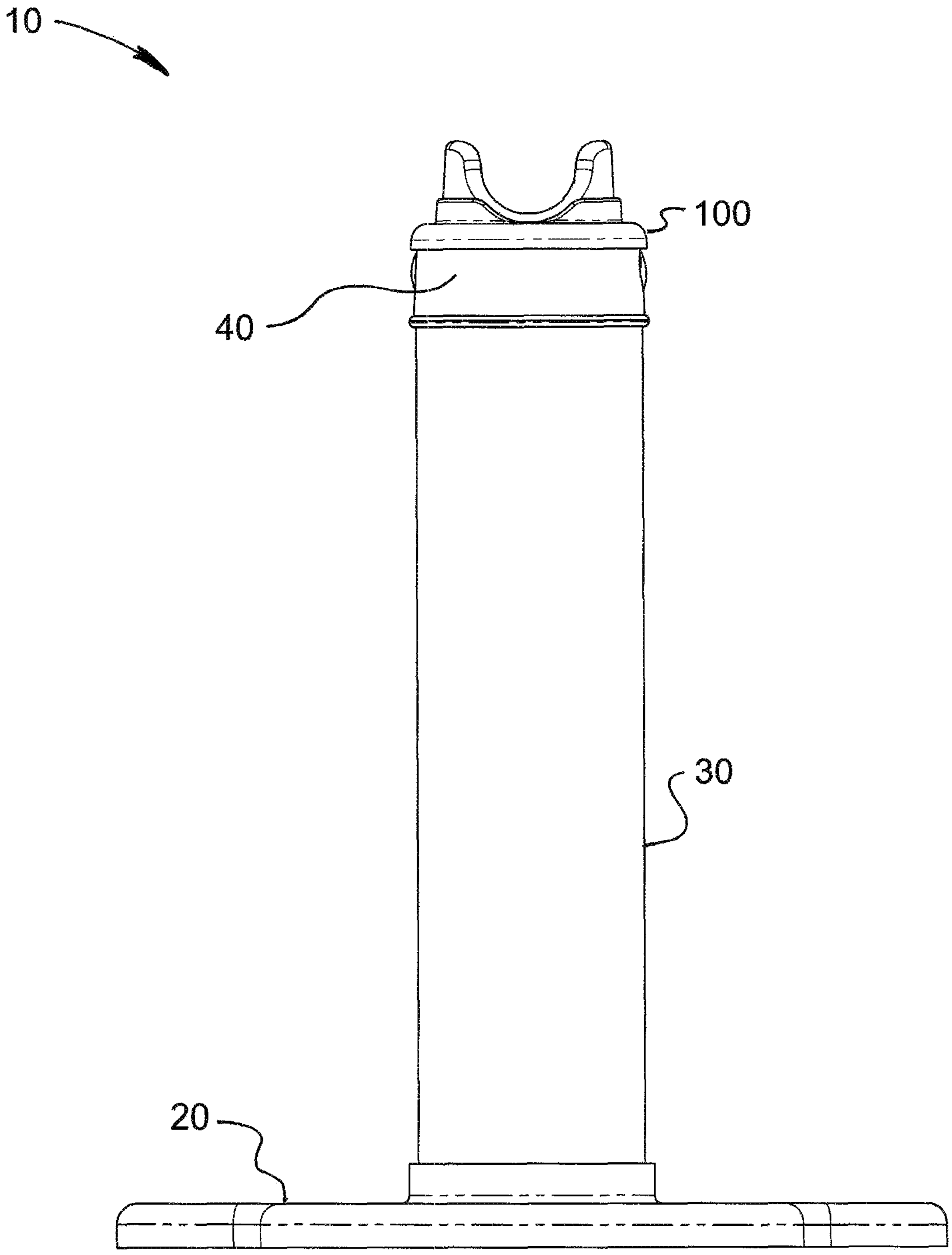
FIG. 4 is a rear elevation view of the embodiment as illustrated in FIG. 1.
Figure 5:
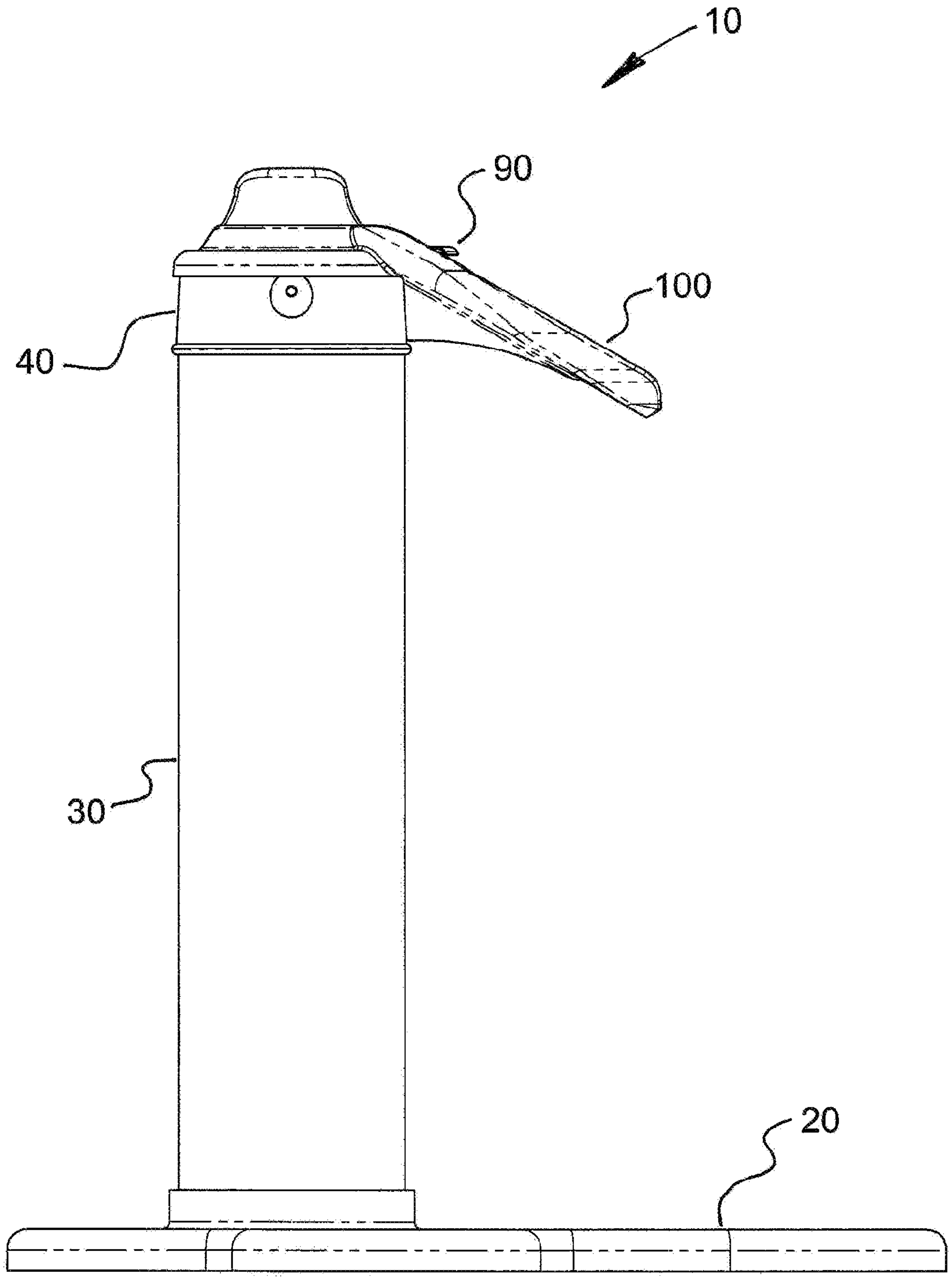
FIG. 5 is a left side elevation view of the embodiment as illustrated in FIG. 1.
Figure 6:
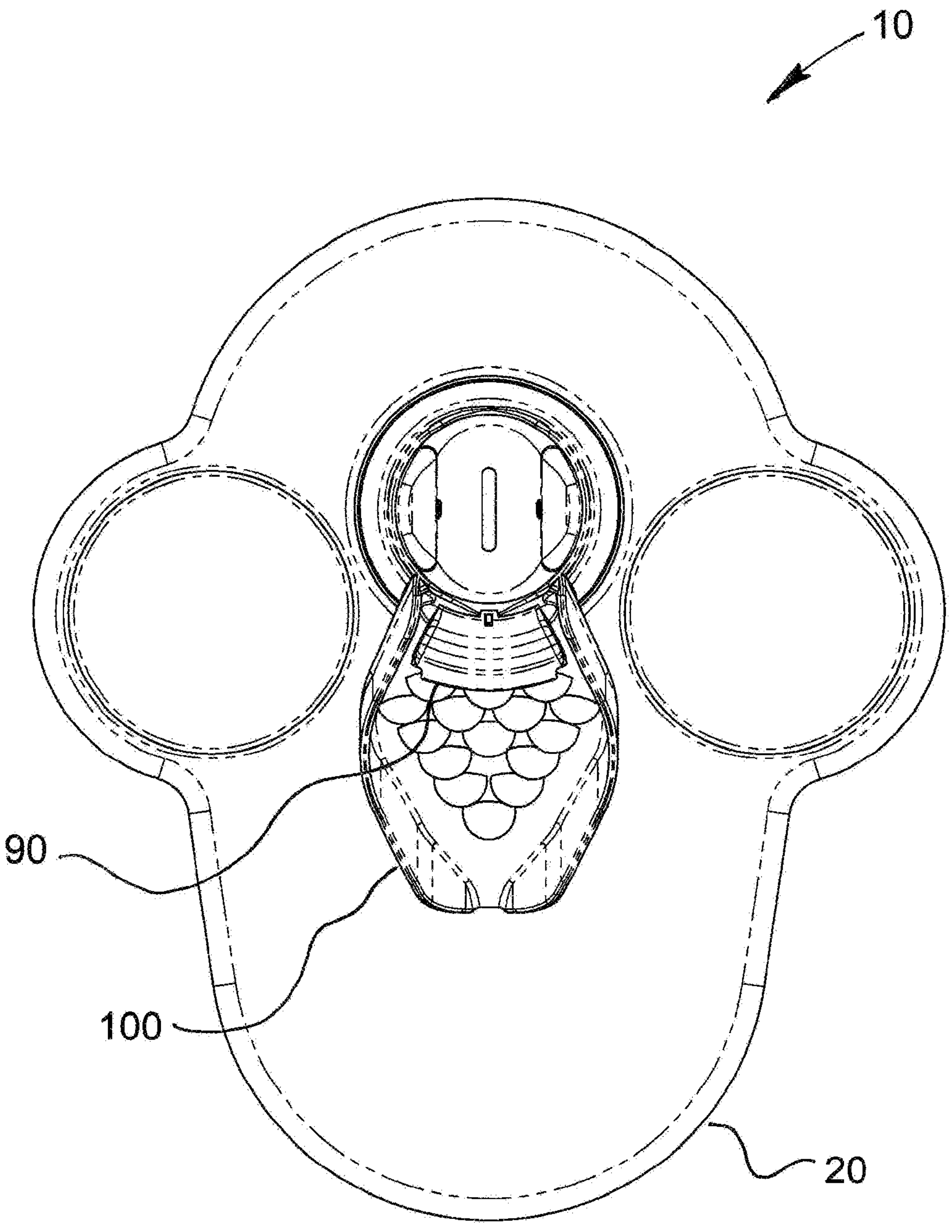
FIG. 6 is a top view of the embodiment as illustrated in FIG. 1.
Figure 7:
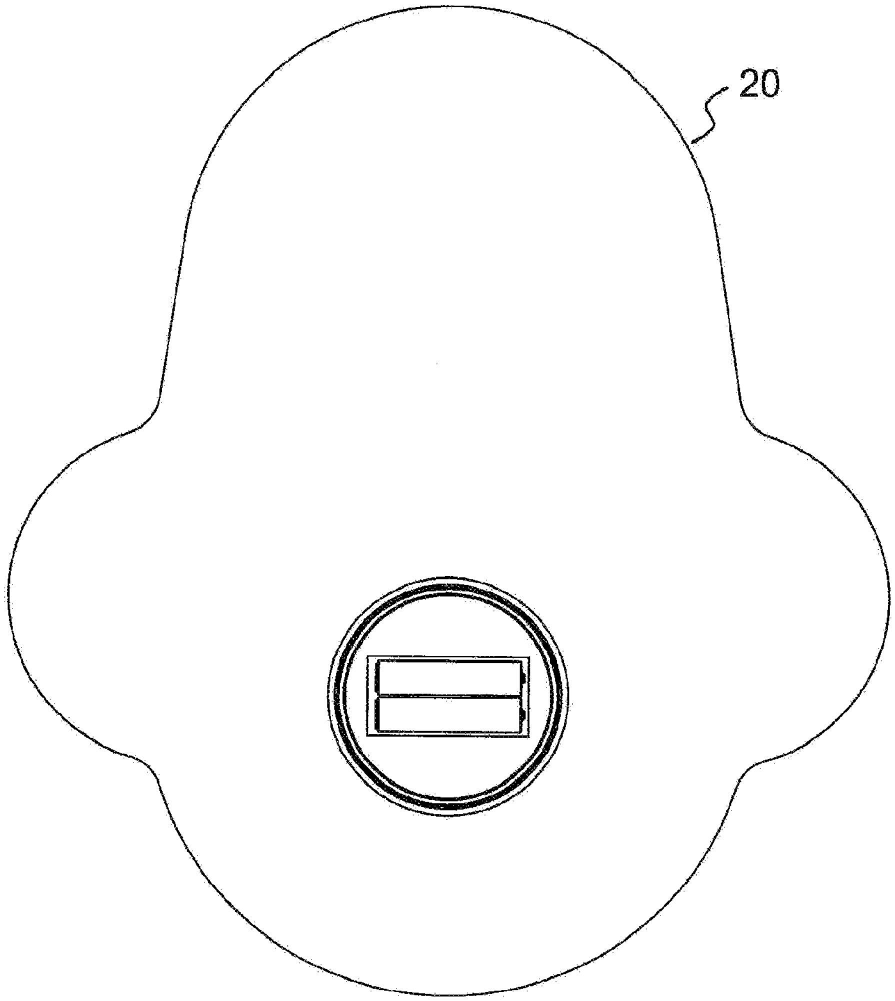
FIG. 7 is a bottom view of the embodiment as illustrated in FIG. 1.

Decanting of a beverage from a storage container, or bottle, after long term storage is a precarious process at best; care must be taken to prevent precipitate and sediment build-up from mixing in with the beverage during the decanting process. The apparatus and method presented herein are developed to aid in this gentle process.

Referring now to FIGS. 1-25, there is shown one exemplary decorative dispensing system including an illuminated beverage decanting apparatus, as well as examples of the apparatus combined with other elements that form the system as used to perform the method described herein.

Turning to FIGS. 1-7, shown therein are illustrative views of the illuminated beverage decanting apparatus 10 shown without a receiving vessel. The apparatus is supported by base 20 with structural support member 30 providing the necessary elevation for the upper housing portion defined by an electronic illumination portion 40 on which the removable filter element 90 and flow channel portion 100 are detachably affixed.

Figure 8:
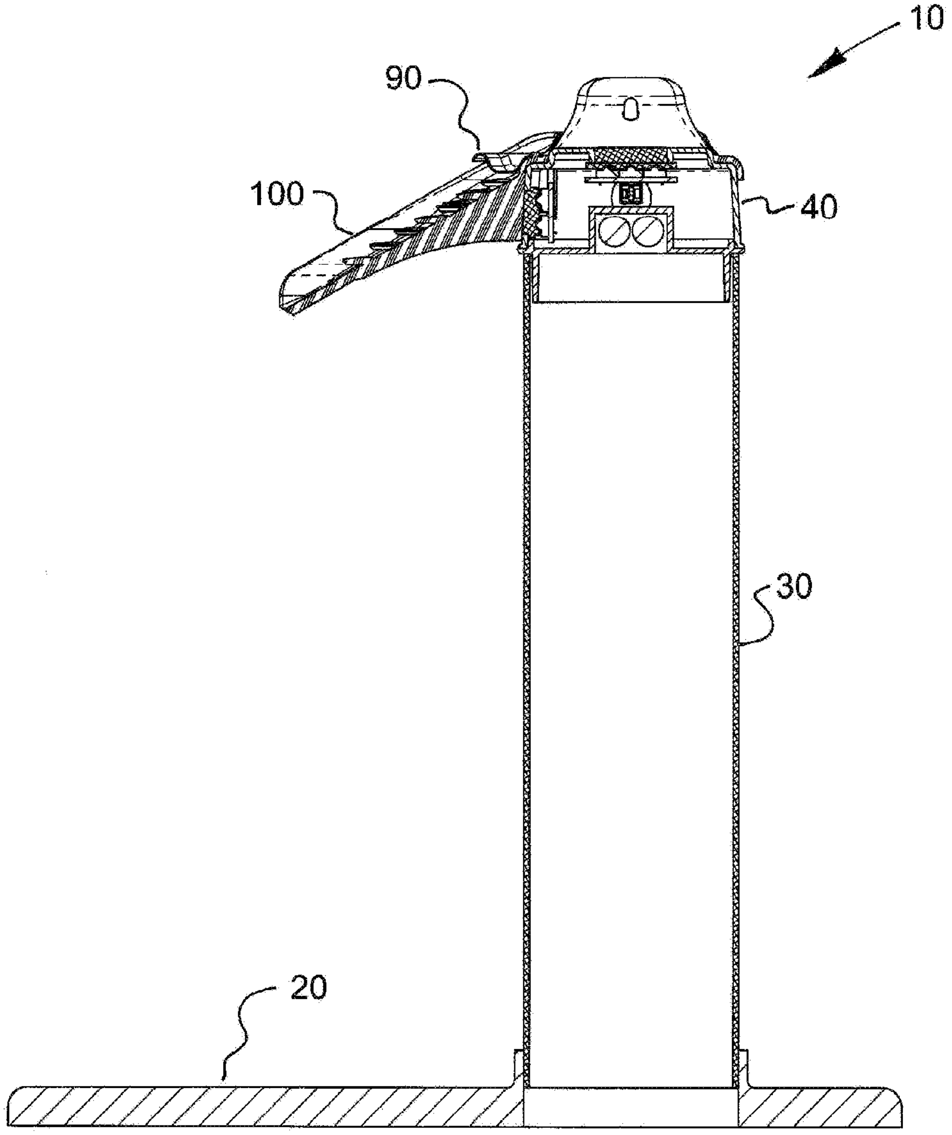
FIG. 8 is a cross sectional view from line 8-8 in FIG. 2.
Figure 9:
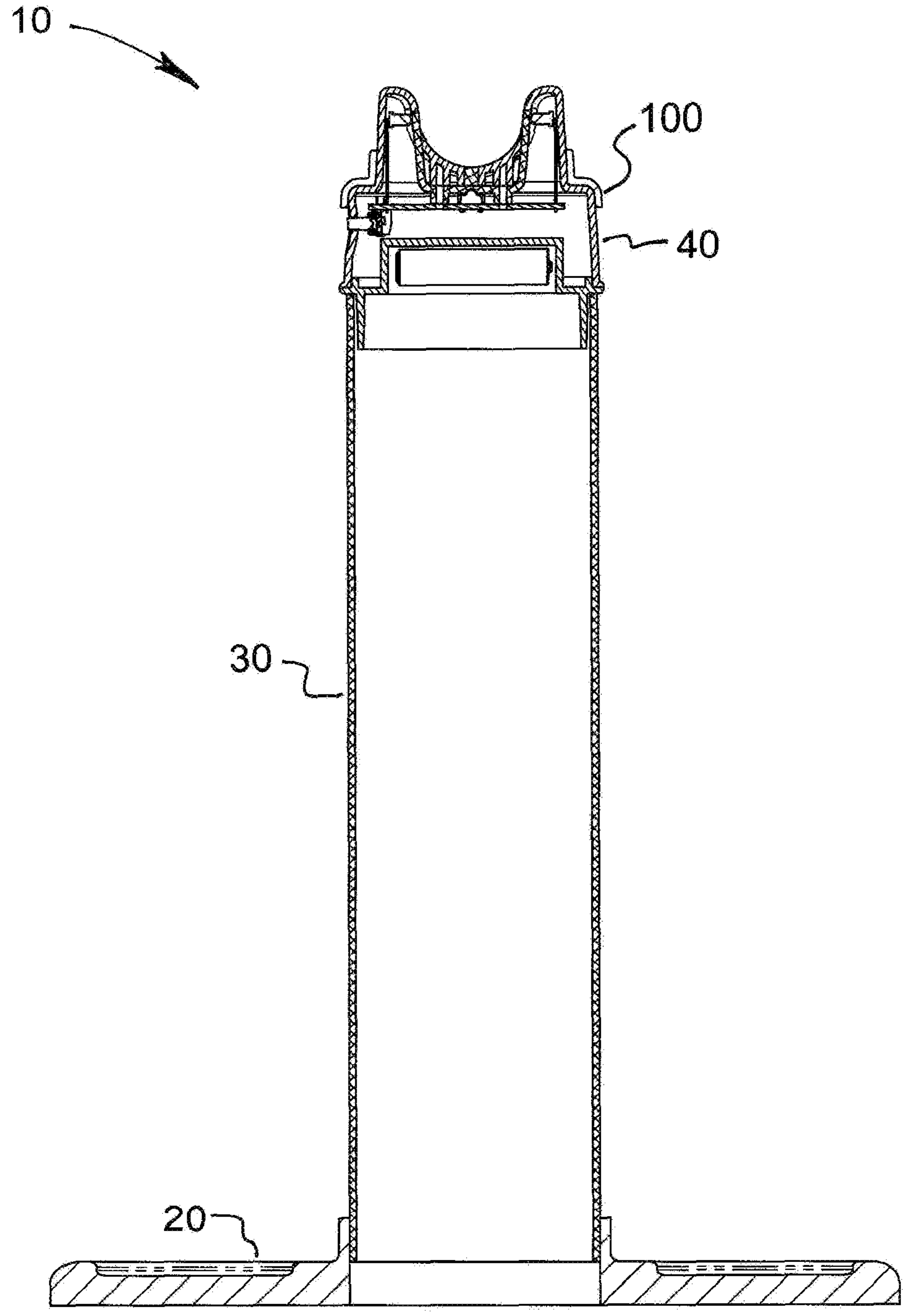
FIG. 9 is a cross sectional view from line 9-9 in FIG. 3.

Turning to FIGS. 8 & 9, shown therein are cross sectional views of the apparatus 10, illustrating the internal geometries of the various elements of the apparatus.

Figure 10:
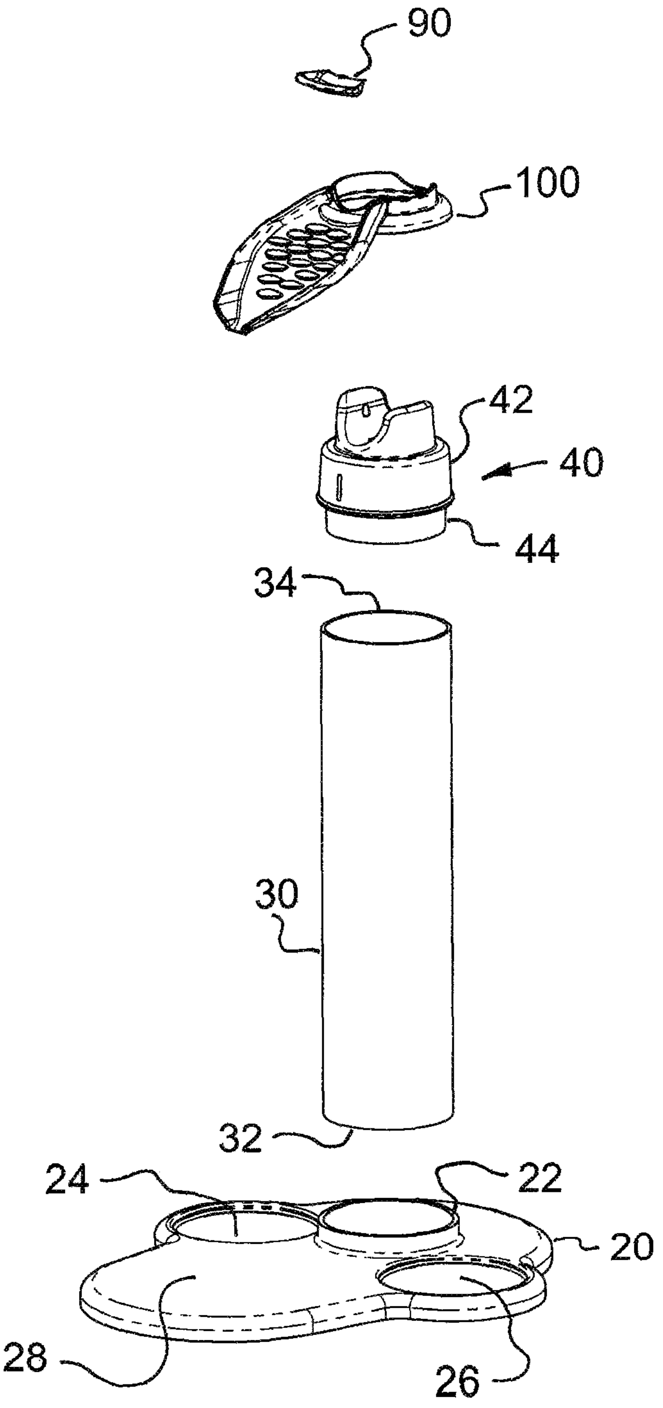
FIG. 10 is an isometric exploded view of the embodiment as illustrated in FIG. 1.

Turning to FIG. 10, shown therein is an illustrative exploded perspective view of the apparatus 10, illustrating each of the main components of the apparatus. Base 20 is shown with receiving surface 22 to accept end surface 32 of the structural support member 30. Also shown on base 20 are depressions 24 and 26 for intuitive placement of the beverage bottle or a stemware glass. It is contemplated that base 20 may be provided with more or less depressions without departing from the inventive concepts disclosed herein. Surface 28 is provided on base 20 to allow the decanting receiving vessel to sit in relation to the dispensing end of the flow channel portion 100 for spill free dispensing. The surface 28 also serves to catch any drips from flow channel portion 100 when the receiving decanter vessel is removed, thereby protecting the table or counter surface on which the apparatus 10 is placed. Structural support member 30 has an open upper end surface 34 which is dimensioned to receive the exterior surface of the bottom housing 44 of electronic illumination portion 40 therein, and providing for the detachable assembly of portion 40 to the structural support 30 without a need for tools. Alternately, bottom housing 44 of electronic illumination portion 40 may be configured to receive the exterior surface of the upper end surface 34 of structural support member 30. Either method of coupling the electronic illumination portion 40 to the structural support member 30 provides a frictional type coupling the provides for quick and easy assembly and disassembly. Electronic illumination portion 40 is detachable from structural support 30 for access to the battery compartment within bottom housing 44 of portion 40.

Turning now to FIGS. 11-18, shown therein are illustrative view of the electronic illumination portion 40, including detail interior views illustrating the functional and optic elements used to support the system and method.

Figure 11:
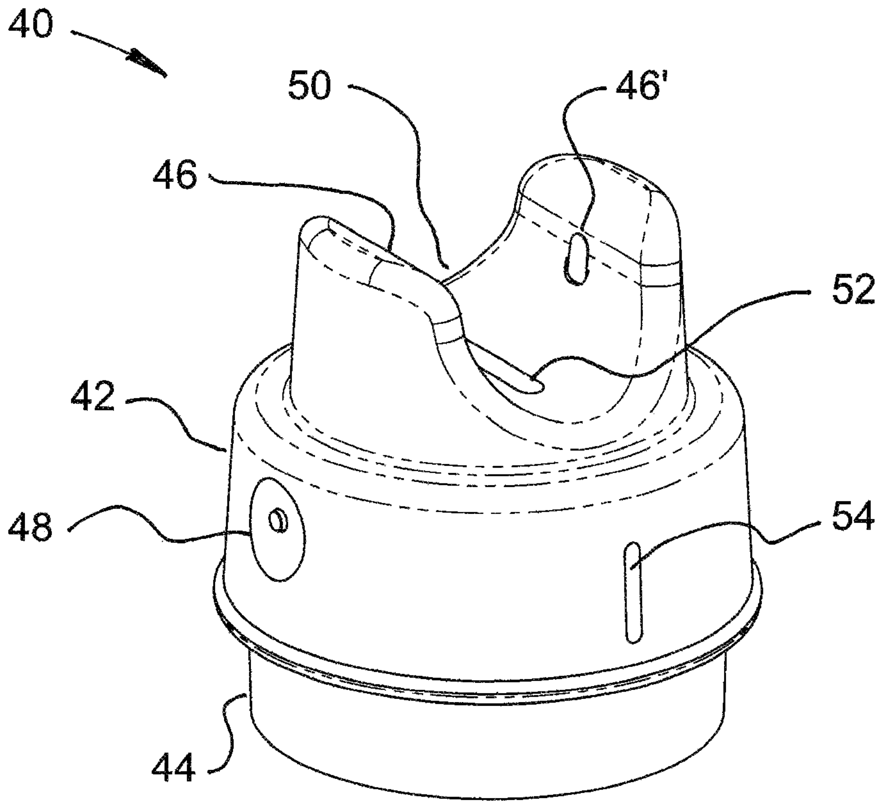
FIG. 11 is a perspective view of a portion of the embodiment as illustrated in FIG. 1.

FIG. 11 is a perspective outer view of the electronic illumination portion 40, showing the upper housing 42, the lower housing bottom 44, the sensor openings 46 and 46', and, the initiation switch recess area 48. The upper housing 44 includes a recess area defining a cradle 50, at the bottom of which is situated the opening 52 for the illumination lens element and opening 54 for the light pipe connection, both of which are part of the internal control circuit assembly discussed in following paragraphs.

Figure 12:
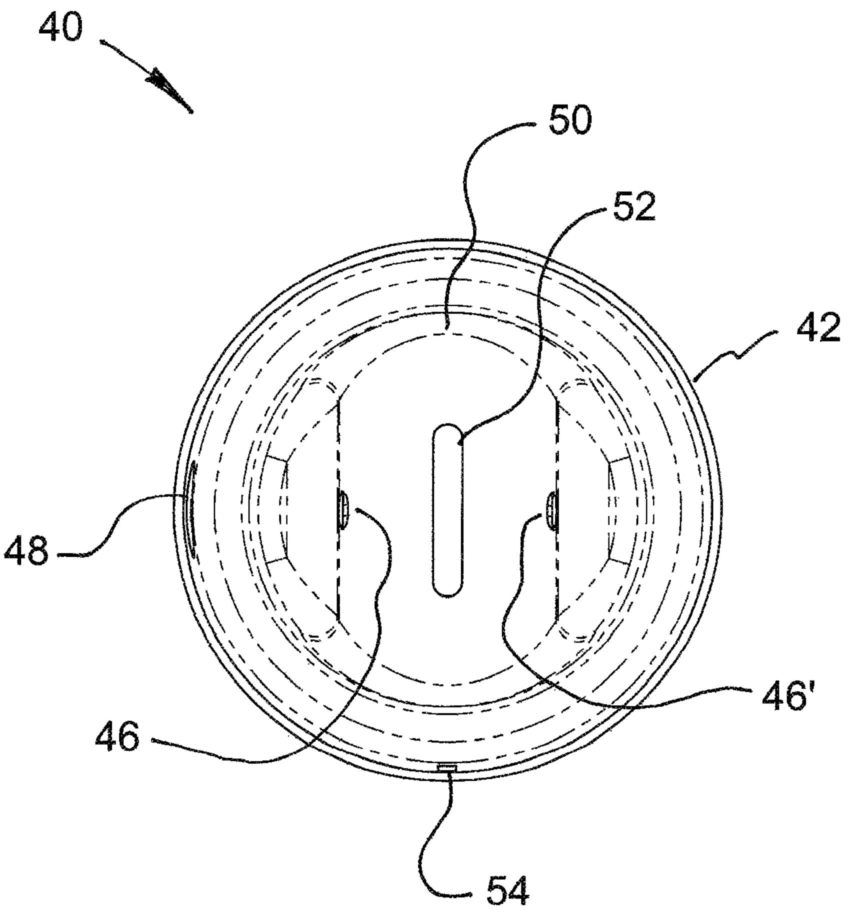
FIG. 12 is a top view of the portion of the embodiment as shown in FIG. 11.

Turning to FIG. 12, shown therein is a top view of the electronic illumination portion 40, again illustrating the major features on the exterior of the device as in FIG. 11. In particular, the relationship between the sensor openings 46 and 46' and the illumination lens element opening 52 can be seen.

Figure 13:
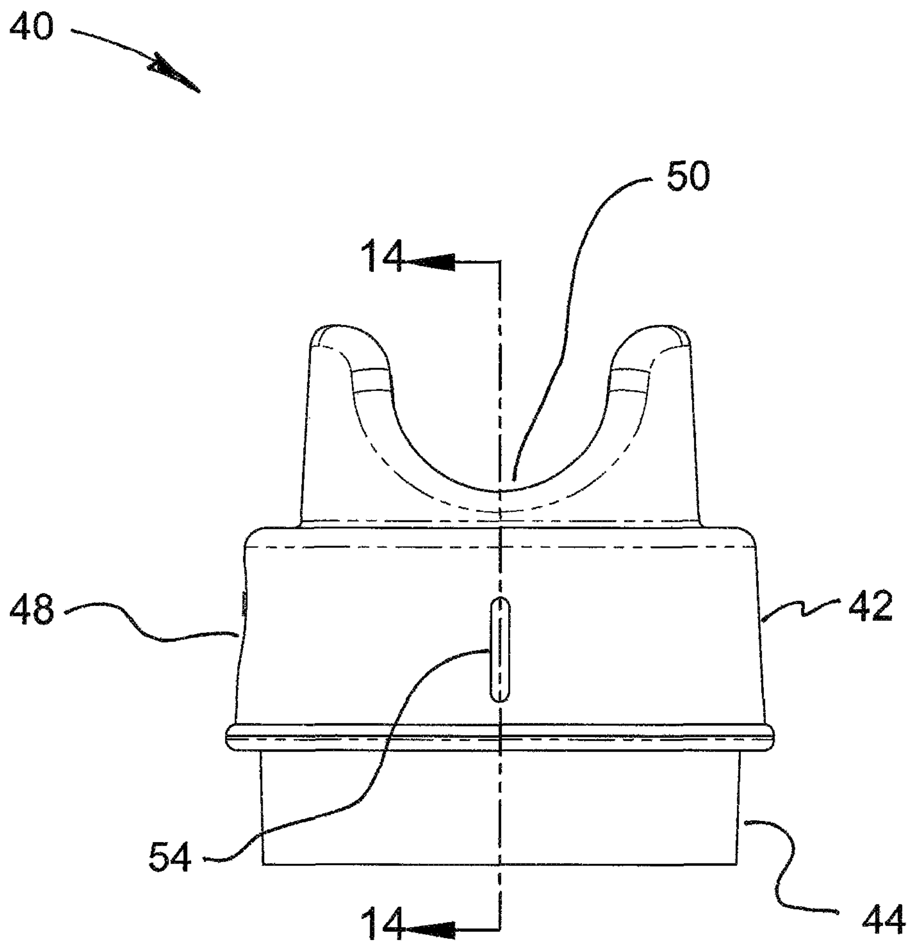
FIG. 13 is a front view of the portion of the embodiment as shown in FIG. 11.

Turning to FIG. 13, shown therein is a front elevation view of the electronic illumination portion 40, again illustrating the major features on the exterior of the device as in FIG. 11, including the light pipe connection opening 54.

Figure 14:
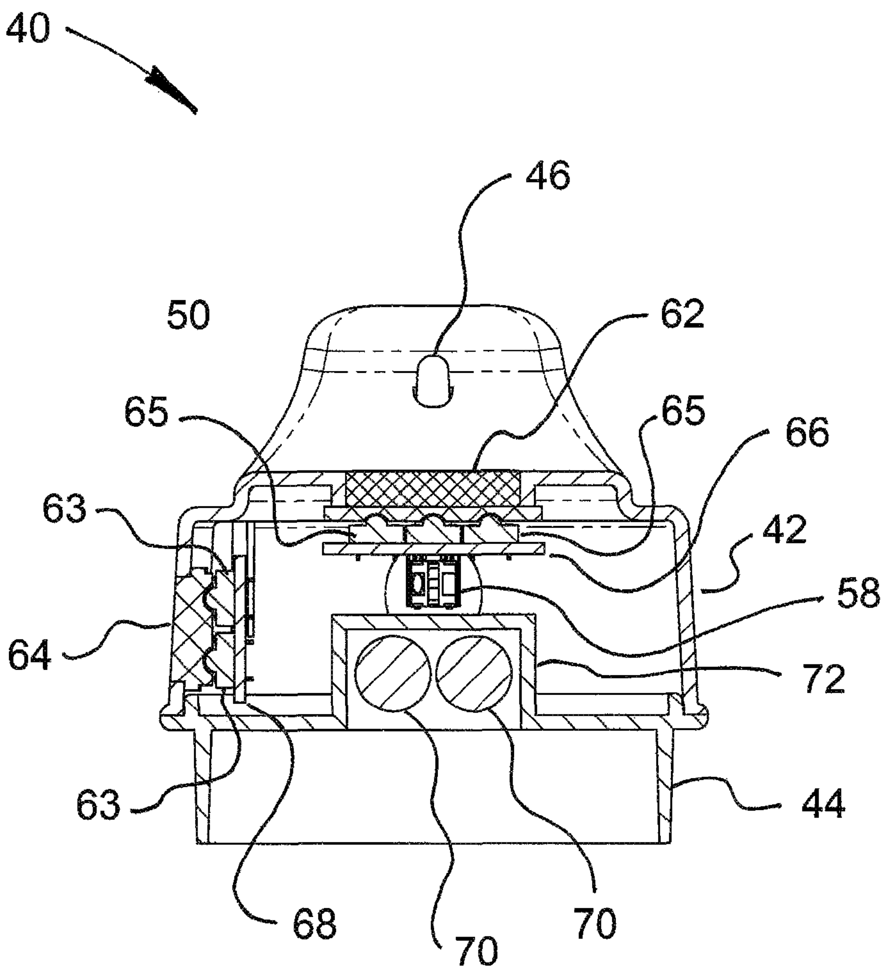
FIG. 14 is a cross sectional view from line 14-14 in FIG. 13.

Turning to FIG. 14, a cross sectional view taken along section line 14-14 of FIG. 13 is shown illustrating an exemplary placement of the internal elements of the electronic illumination portion 40. Within the upper housing 42 there are several elements with control functions and the generation of the desired illumination for the device. Lens elements 62 and 64 respectively reside within the openings 52 and 54 of the upper housing 42. Likewise, initiation switch 58 resides within recess opening 48 of the upper housing 42 as well. Control circuit boards 66 and 68 contain the necessary electronic components to drive corresponding light emitting diodes (LEDs) 63 and 65 associated therewith. Although two control circuit boards with separate light sources are described herein, it is contemplated that they may be consolidated as a single control circuit board with separate sources thereon or a single light source optically coupled to the openings 52 and 54 using light-pipes or optical fibers, for example. Control circuit boards 66 and 68 further provide the appropriate time delays as predetermined within the circuit logic thereof. Here again, the time delay functions may be consolidated on a single control circuit board, such as control circuit board 66, while the second control circuit board 68 provides the LED driving function for LEDs 63. Batteries 70 are connected to the control circuit boards 66 and 68 and reside in a battery compartment 72 of the lower housing bottom 44 and are accessible through the open end of the lower housing bottom 44.

Figure 15:
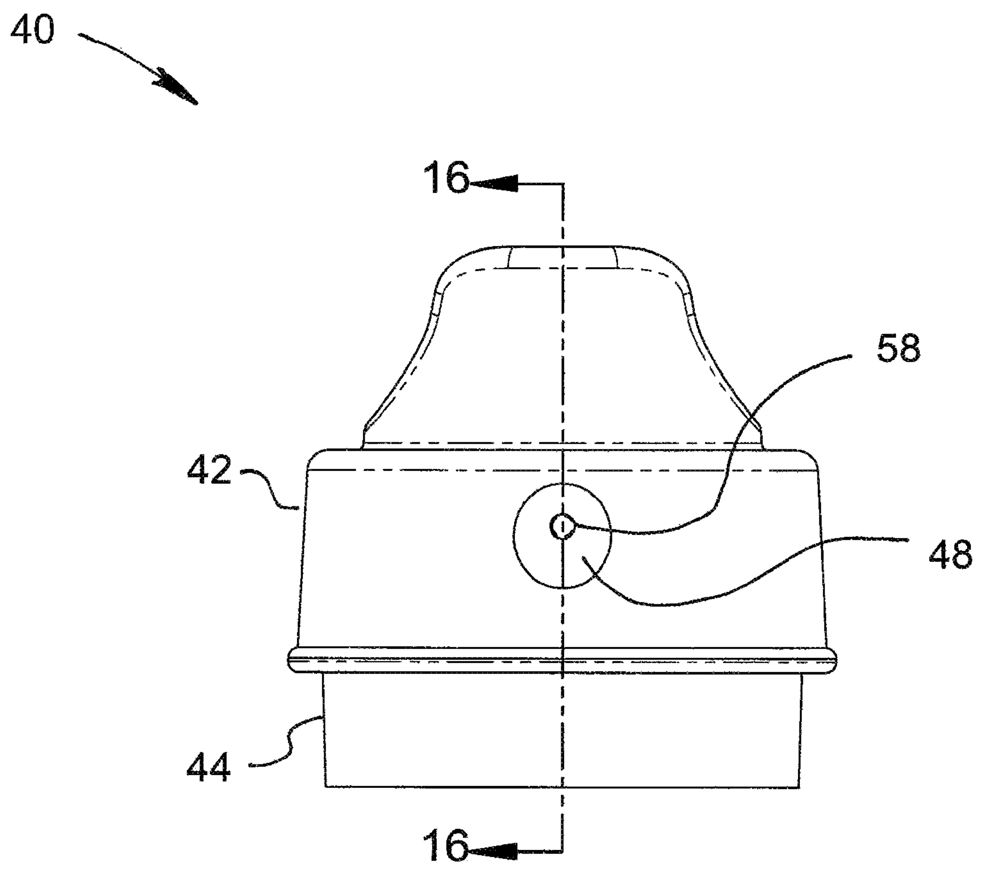
FIG. 15 is a left side view of the portion of the embodiment as shown in FIG. 11.

Turing to FIG. 15, shown therein is a left side view of the electronic illumination portion 40, illustrating external features as previously described.

Figure 16:
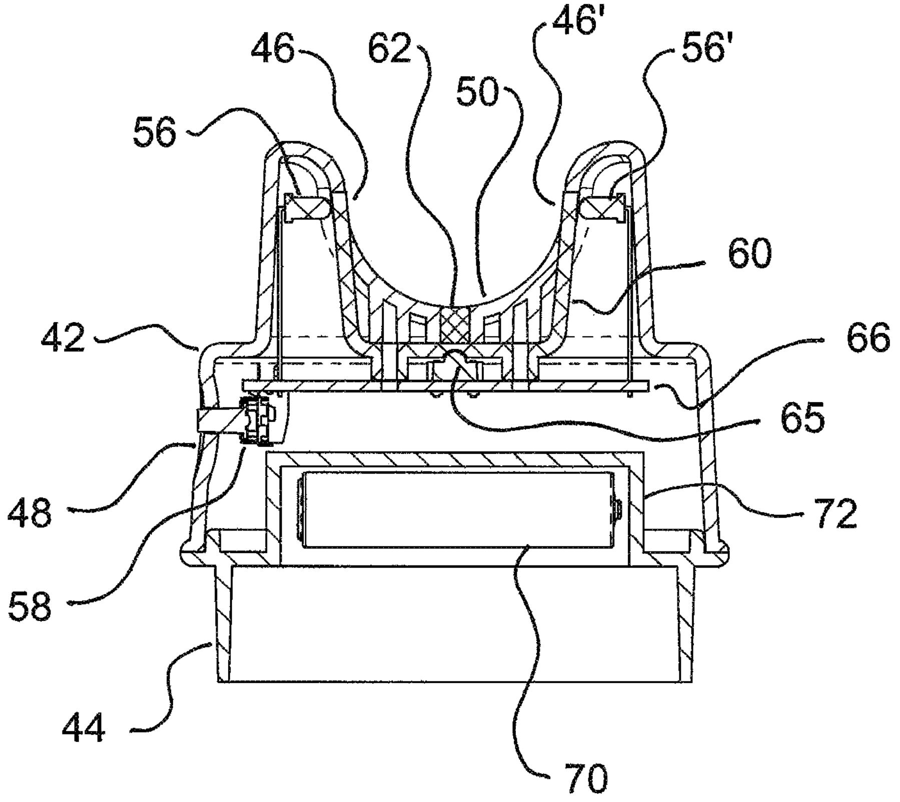
FIG. 16 is a cross sectional view from line 16-16 in FIG. 15.

Referring to FIG. 16, there is shown a cross sectional view as taken along section line 16-16 of FIG. 15, further illustrating the exemplary placement of the internal elements of the electronic illumination portion 40. Within the upper housing 42 there are several elements used in conjunction with the control and generation of the desired illumination for the device, including the sensing elements 56 and 56' which reside in openings 46 and 46', respectively. The sensing elements 56 and 56' work with each other to detect any interruption of a light beam between them. Hence, when a neck of a bottle is rested in the cradle 50, ready to begin the dispensing operation, the sensing elements 56 and 56' will detect the presence of the bottle and provide the appropriate signal to the control circuit boards 66 and 68 to provide power to the LEDs 63 and 65 and thereby provide illumination. Since the sensing elements require some low level of power, the control circuit logic of control circuit board 66 will only provide such power after initiation switch 58 is momentarily closed. Closure of this initiation switch 58 signals the control logic that the user is ready to use the device and power is provided to the sensing elements for a predetermined time duration. This time duration is in the approximate range of two to four hours, enough for one evening of use in a normal household setting. Once the initiation switch 58 has been actuated, the device then will operate automatically, based on detection of a bottle by the sensing elements 56 and 56'.

The illumination will be initiated whenever the light beam between the sensing elements 56 and 56' is interrupted by a bottle neck being positioned for pouring and dispensing therefrom. Once the bottle neck is removed from the cradle 50, the sensing elements 56 and 56' detect this event and send a signal to the control logic for initiating a delay timer to delay, for a predetermined time, for example one to five minutes, removal of power from the LEDs 63 and 65 and thereby extinguish the illumination. The illumination provided by LEDs 65 passes through the neck and shoulder portions of the original container, allowing the user to detect when sediment begins to flow with the beverage and thus then stop the pouring the beverage. Any sediment that inadvertently flows from the container will be captured by the removable filter 90.

Figure 17:
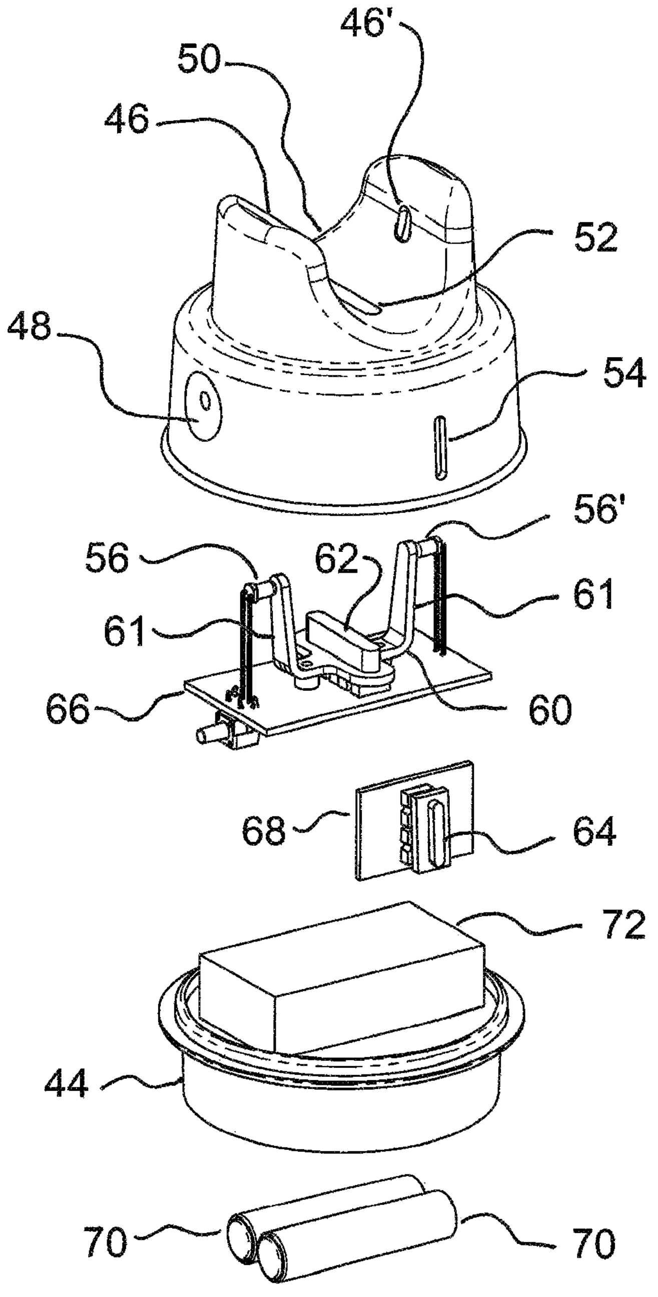
FIG. 17 is an isometric exploded view of the portion of the embodiment as shown in FIG. 11.

Turning now to FIG. 17, there is shown an exploded perspective view of the electronic illumination portion 40 to further illustrate the internal elements thereof. Wires for electrical connection between the control circuit boards 66 and 68, and between the battery compartment 72 and the control circuit boards 66 and 68 are not shown in the illustration for clarity, however, such interconnections are well within the skills of those skilled in the art. This exploded view shows in greater detail a lens assembly 60 which includes the lens 62 for the main LED illumination from LEDs 65 and also provide the lens coverings 61 for the sensing elements 56 and 56'. The initiation switch 58 may be mounted to the control circuit board 66, as shown, or mounted to the upper housing 42 and electrically connected to the control circuit board 66. Lens 62 focuses the light from one or more LEDs 65 into a beam that extends longitudinally, in the same direction as that of beverage container's neck extends and is sufficiently long to illuminate the shoulder portion from which the neck extends. By that arrangement, the flow of beverage through the neck and shoulder portions of the beverage container can be well visualized and allow the user to detect when any sediment begins to enter the flow from the container and then stop dispensing the beverage from the container.

Figure 18:
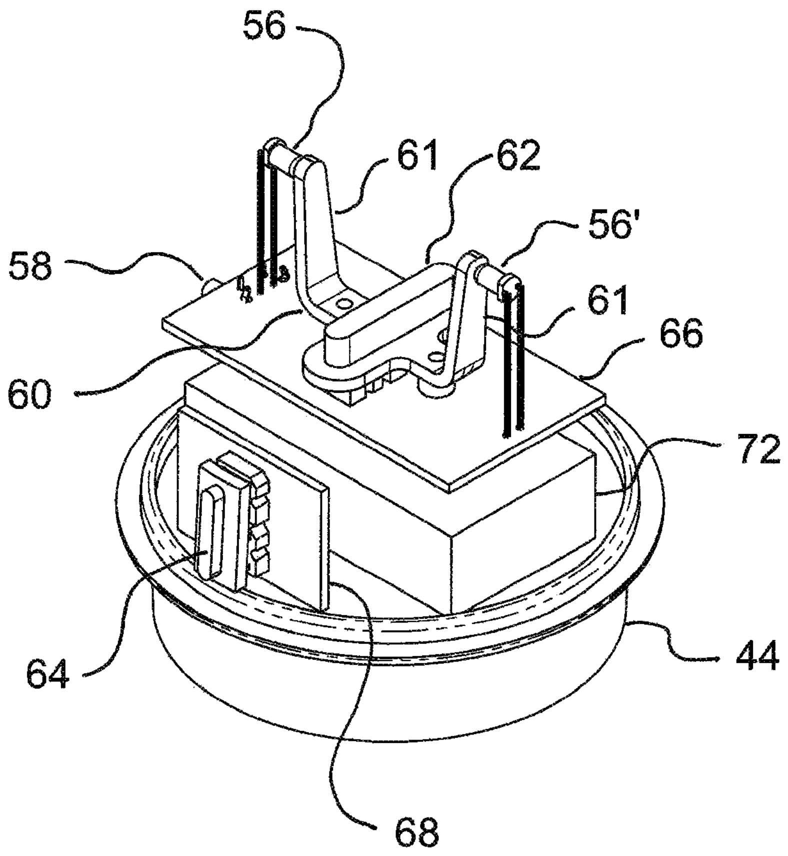
FIG. 18 is a perspective view of the portion of the embodiment as shown in FIG. 11, with the top cover portion removed for illustrative clarity.

FIG. 18, shows a detailed perspective view of the lower housing bottom 44 assembled with the control circuit board 66 with lens assembly 60 and control circuit board 68 with lens 64 in position.

Figure 26:
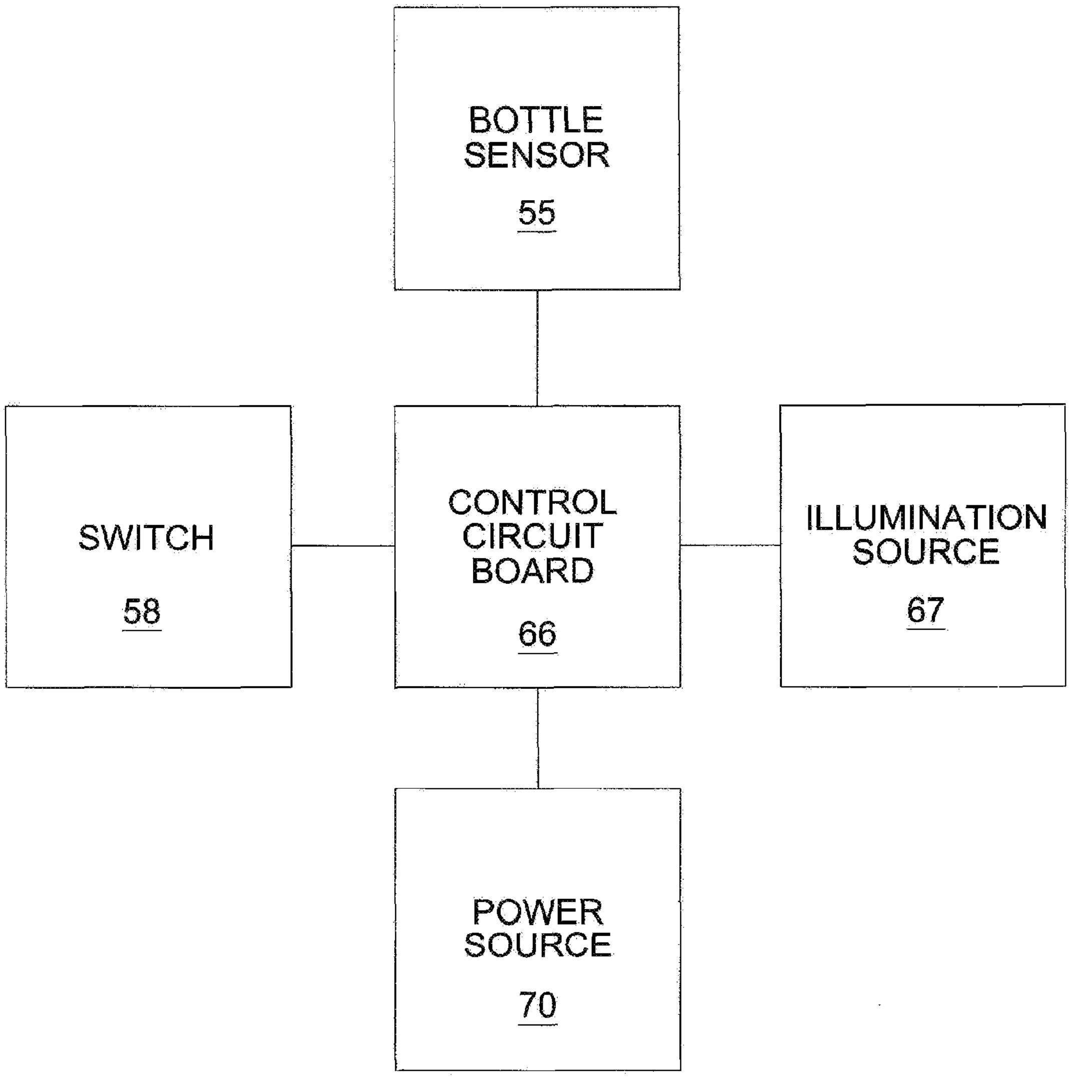
FIG. 26 is a simplified electrical block diagram of the illumination and sensing functions of disclosed apparatus.

In summary, the illumination and sensing functions can be understood by referring to the simplified electrical block diagram of FIG. 26. The control circuit board 66 is coupled to the power source 70 and is inactive until initiated by closure of the switch 58 that is coupled thereto. Once activated, the bottle sensor 55 is enabled for detecting the presence of the neck of a bottle in the cradle 50. As described previously, the bottle sensor 55 is formed by optical sensing elements (an emitter and a receiver) 56 and 56', as are well known in the art. Alternately, the sensor 55 may be a mechanically actuated weight sensitive switch or ultrasonic proximity sensor. The enablement of bottle sensor 55 is maintained to a prescribed length of time based on a first timing function of control circuit board 66. Responsive to detection of the neck of a bottle being positioned in the cradle 50, control circuit board 66 initiates illumination source 67 to output a light beam to illuminate the cradle 50 and the light-pipe formed by the structural rib 122. The illumination source 67 is formed by a pair of groups of multiple LEDs 63 and 65, but may be formed by a single LED or a single group of LEDs. Upon the bottle sensor detecting removal of the neck of a bottle in the cradle 50, the enablement of the illumination from illumination source 67 is maintained for a certain time period control circuit based on a second timing function of control circuit board 66. With the illumination source 67 being formed by a pair of groups of multiple LEDs 63 and 65, their illumination may be maintained for different time intervals using a third timing function of control circuit board 66 to control one group of LEDs, while the second timing function controls the other group.

Turning to FIGS. 19-22, shown therein are views of the removable flow channel portion 100, formed as one piece with a coupling portion 101 at one end thereof and a flow channel 103 extending therefrom, wherein FIGS. 19-22 illustrate the many features incorporated into this removable element.

Figure 19:
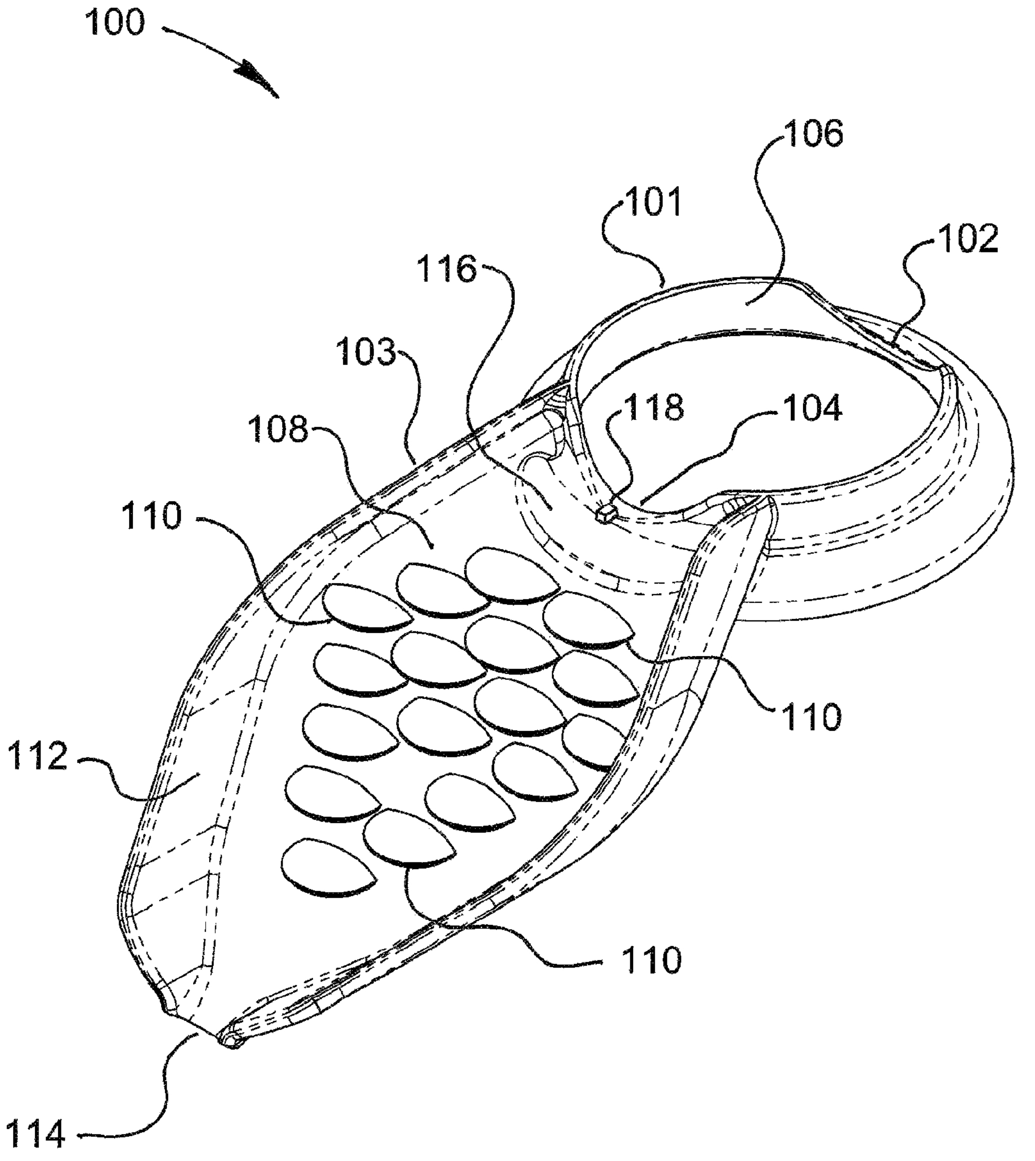
FIG. 19 is a detailed perspective view of a portion of the embodiment as shown in FIG. 1, highlighting the removable flow channel features.

Now referring specifically to FIG. 19, a perspective view of the removable flow channel portion 100 is shown. The flow channel portion 100 has a coupling portion 101 with recesses 102 and 104 on the upper surface to correspond with the cradle portion of the electronic illumination portion 40 previously described. The recesses 102 and 104 correspond to recess area of the cradle 50 and provide adequate clearance for the neck of the bottle during the dispensing operation. Internal circular surface 106 of the coupling portion 101 allows the flow channel portion 100 to be detachably affixed to the aforementioned electronic illumination portion 40 with a snug radial fit between the two components when installed. The flow channel portion 100 can therefore be installed on the electronic illumination portion 40 and removed therefrom without the need for tools. The flow channel portion 100 includes the flow channel 103 having a lower flow surface 108 situated at a lower elevation than the protuberance elements 110 to cause the beverage to tumble across the multiple protuberance elements 110 creating a turbulent flow as the beverage cascades downward over successive protuberance elements 110 during the pour operation toward the dispensing lip 114. The flow channel 103 has side walls 112 that are formed upward from the lower flow surface 108 on opposing sides of flow channel portion 100 in an effort to contain the flowing beverage liquid and focus the flow downward and towards the dispensing lip 114. The flow channel 103 further has a recessed surface 116 and lock element 118 that are incorporated into the unitary single piece removable flow channel portion 100 to allow removable filter element 90 to be detachably affixed to the removable flow channel portion 100. The removable filter element 90 prevents any sediment that is inadvertently poured from the original container from being dispensed to a decanter or glass.

Figure 20:
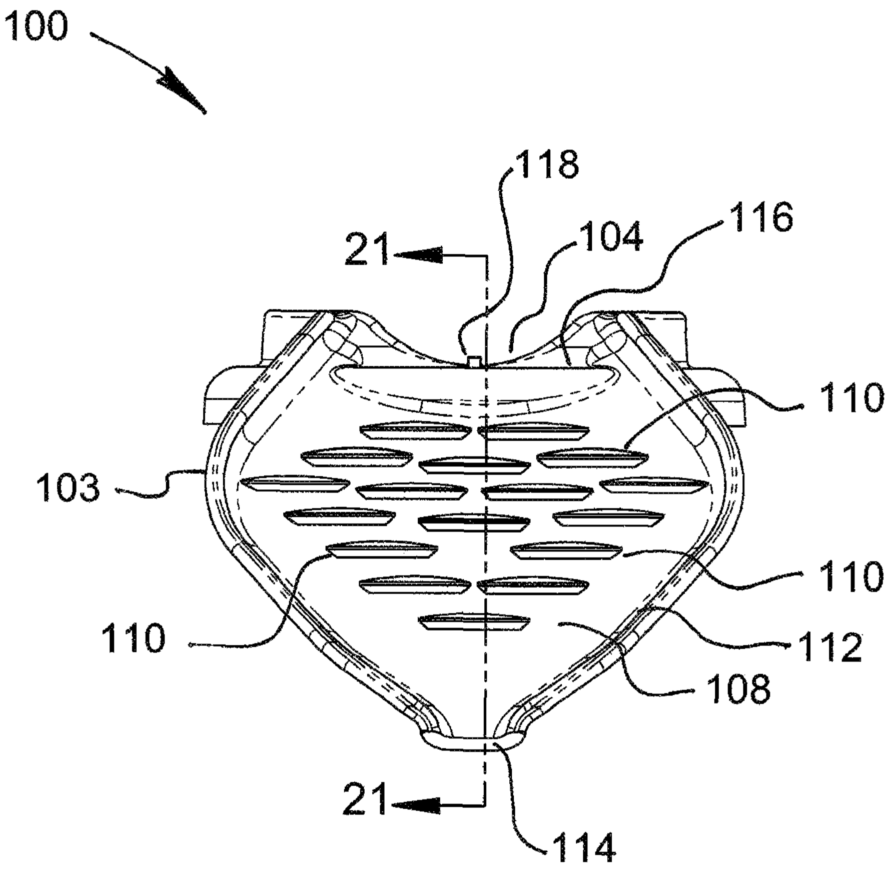
FIG. 20 is a front view of the portion of the embodiment as shown in FIG. 19.

Turning to FIG. 20, shown therein is a front view of the flow channel 103, illustrating the geometric shape and design of the part showing the downward and focused flow path over the protuberances 110 to the dispensing lip 114.

Figure 21:
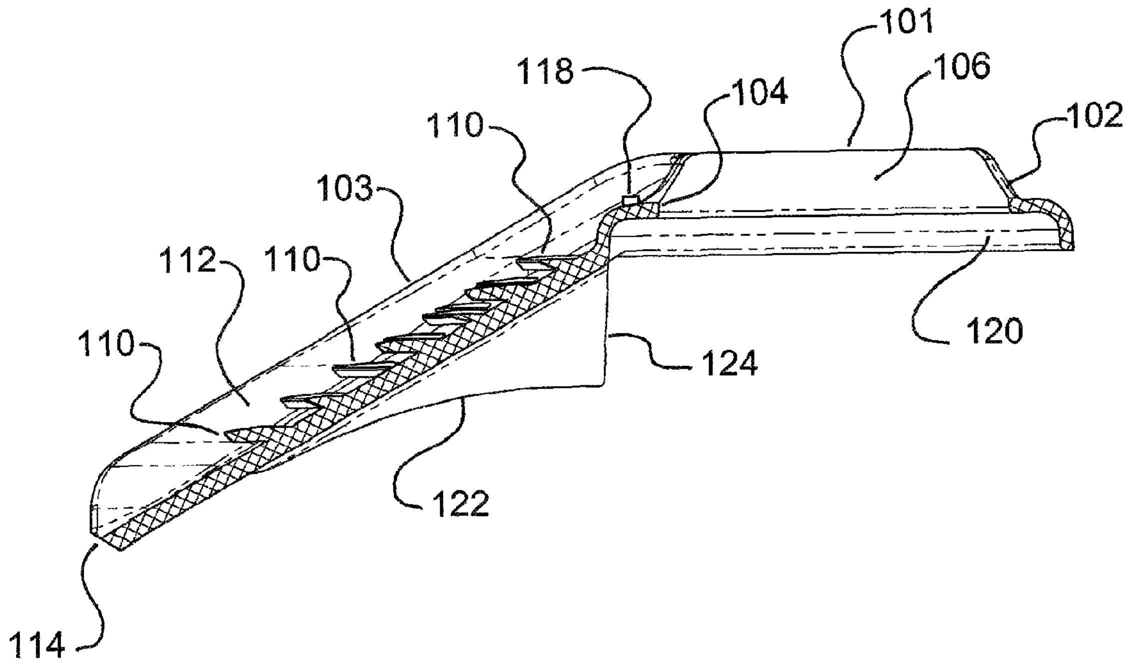
FIG. 21 is a cross sectional view from line 21-21 in FIG. 20.

In FIG. 21, a cross sectional view taken along line 21-21 of FIG. 20 is shown. In this view, features in the underside portion of the removable flow channel portion 100 can be seen, namely the structural ring 120 for detachable affixing to the electronic illumination portion 40. Removable flow channel portion 100 includes a structural rib 122 that adds rigidity to the flow channel 103 and also functions as a light-pipe to transmit light from the electronic illumination portion 40 to the upper surface of the flow channel 103. The structural rib 122 has a vertical face 124, which when coupled to the electronic illumination portion 40 is adjacent to lens 54, thereby providing a connection to the light-pipe formed by structural rib 122 from the illumination source 63, through lens 54, into surface 124, which is then transmitted to the lower surface 108 of the flow channel 103 thereby. In this manner, and with selective surface finishes used, where appropriate, a soft, diffuse, glowing illumination can be provided beneath the flow surface as the beverage is flowing across the surface for a pleasing aesthetic effect.

Figure 22:
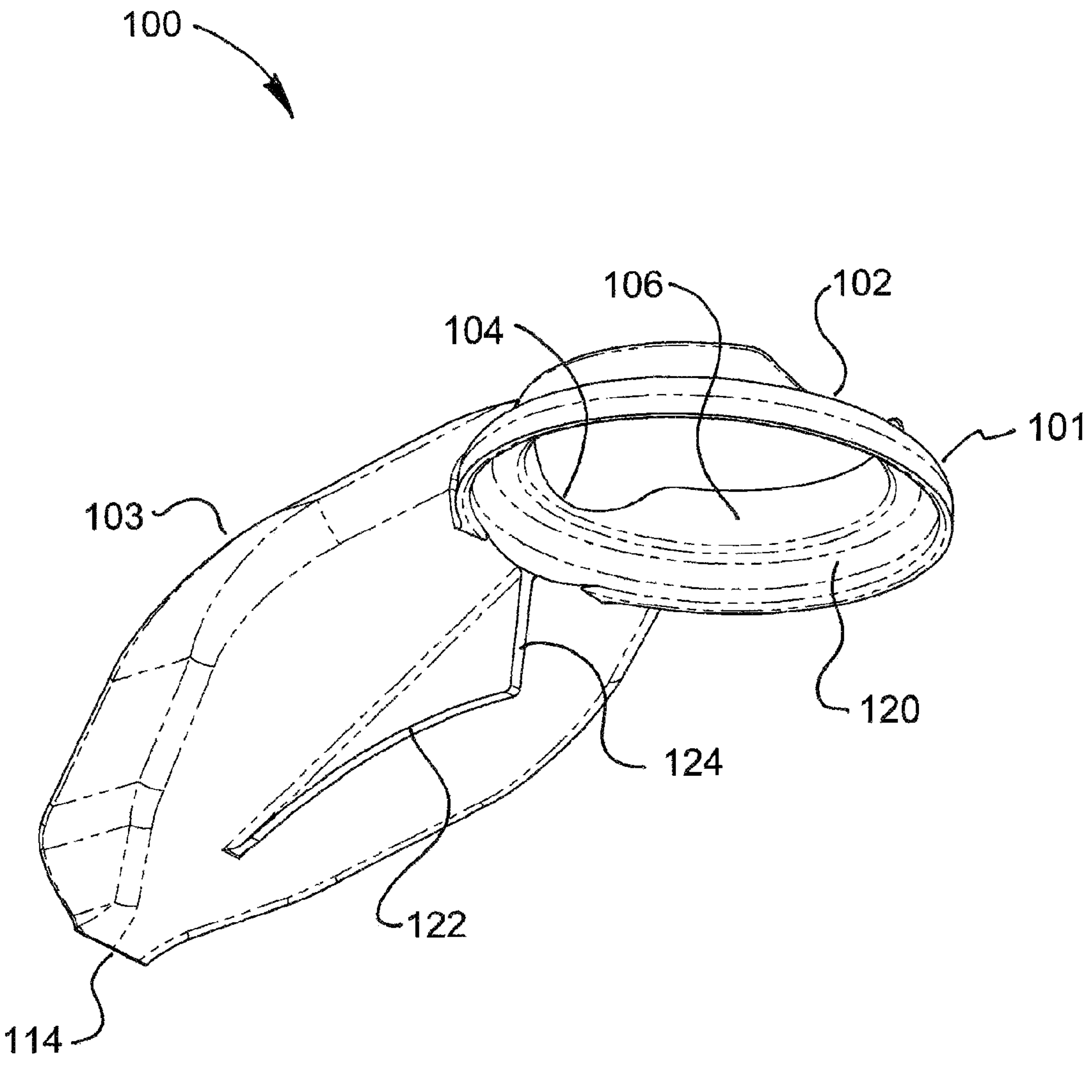
FIG. 22 is a rotated perspective view of the embodiment as shown in FIG. 19, rotated to highlight the underside features of the removable flow channel.

Turning to FIG. 22, there is shown, a rotated perspective view illustrating the underside of the removable flow channel portion 100. Again, in this view one can clearly see the surfaces 106 and 120 of the coupling portion 101 used for detachable interconnection to the electronic illumination housing 40 as well as the structural rib 122 and light pipe mating vertical surface 124 of the flow channel 103.

Figure 23:
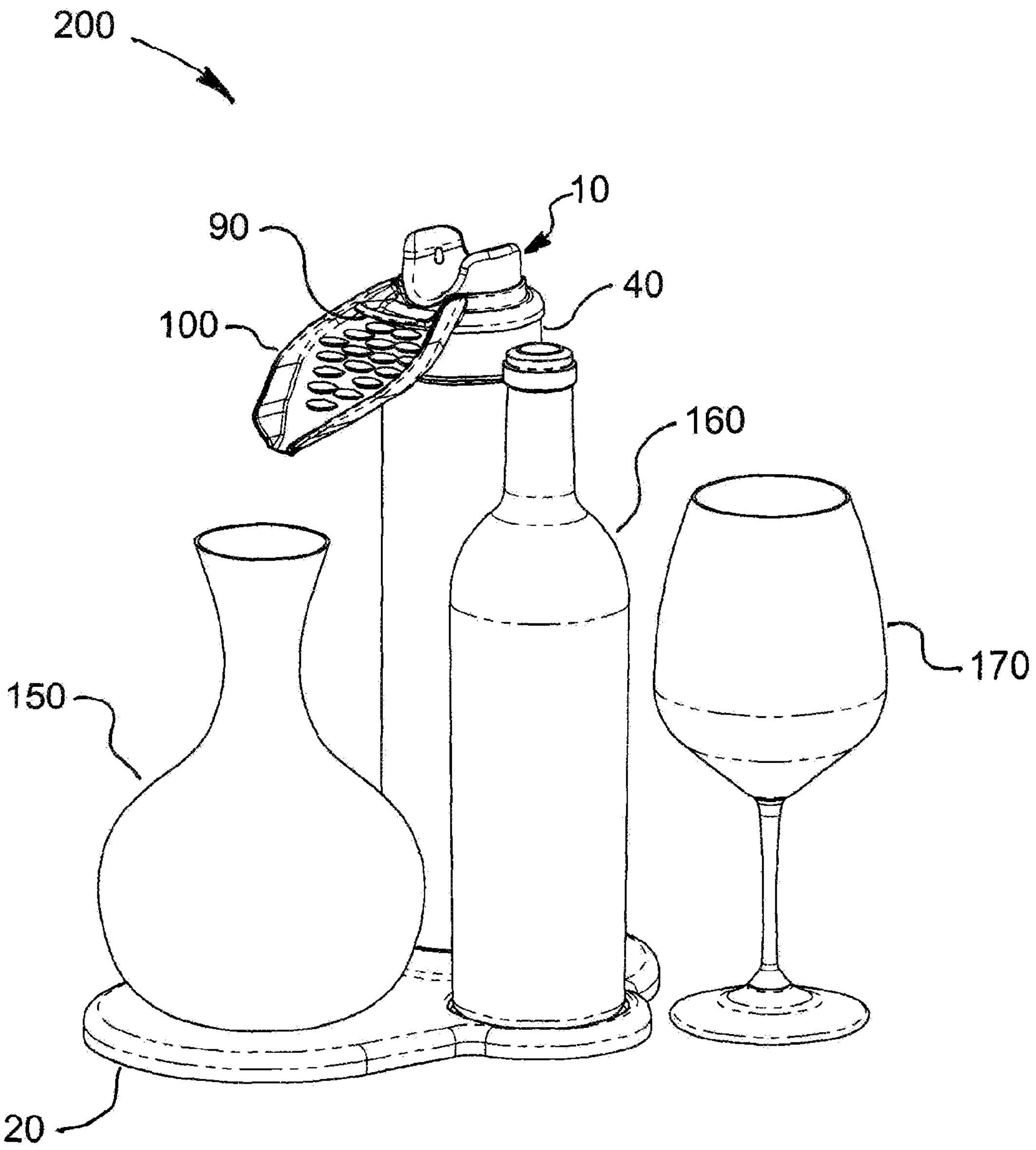
FIG. 23 is a perspective view of the preferred embodiment system ready for dispensing, filtering and aerating.
Figure 24:
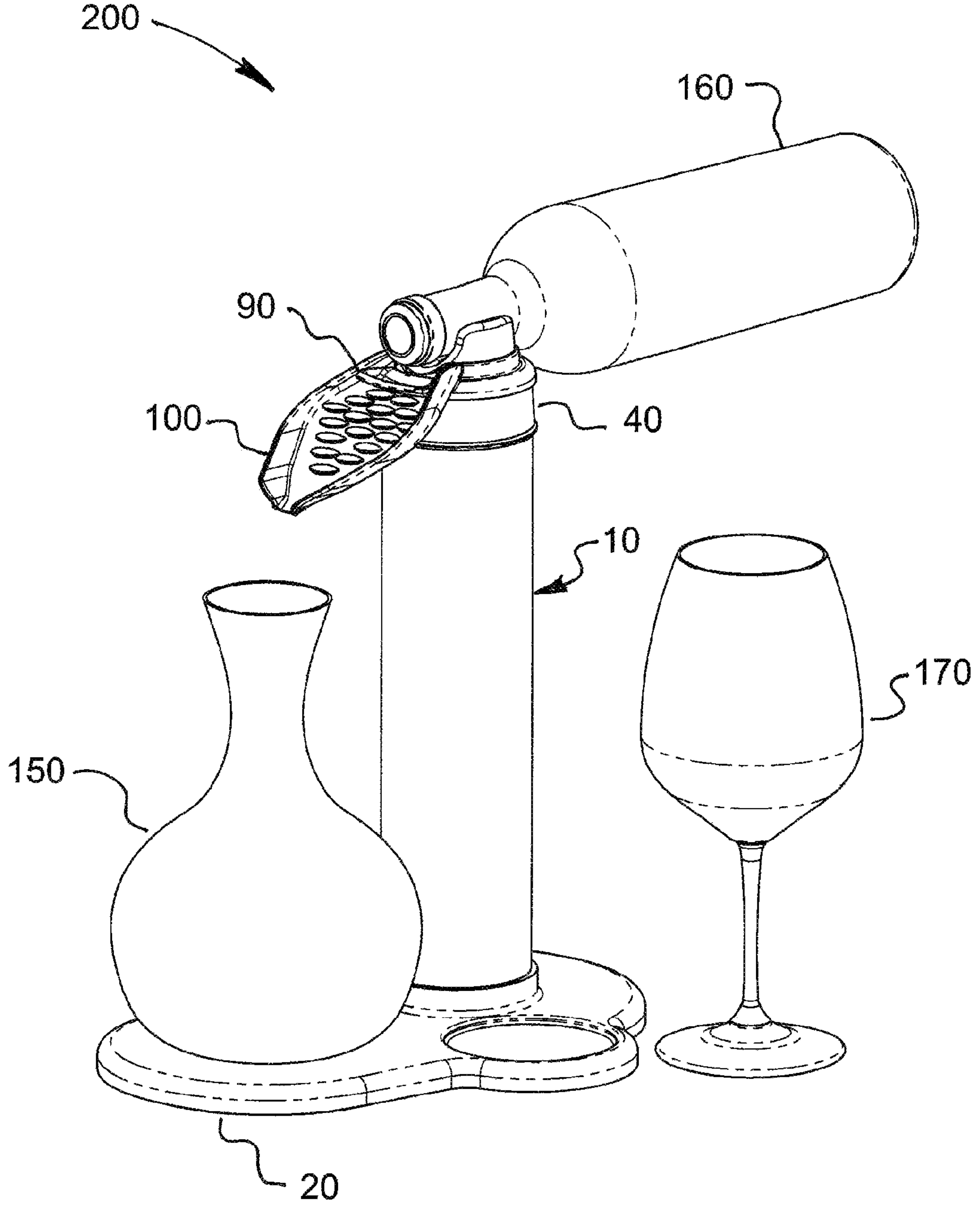
FIG. 24 is a perspective view of the preferred embodiment system shown in-use with the bottle neck seated within the cradle, dispensing the liquid beverage into a decanter vessel.
Figure 25:
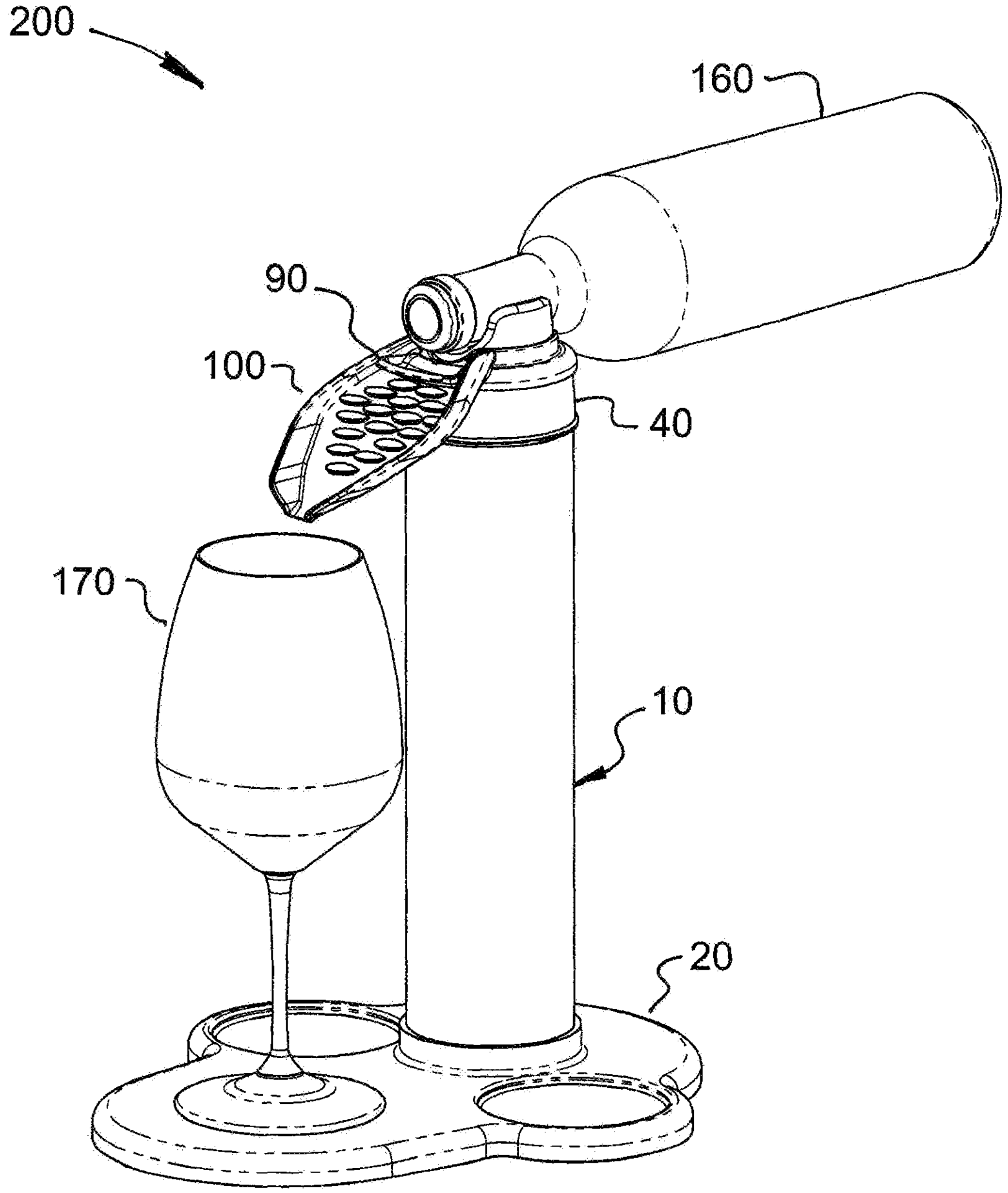
FIG. 25 is a perspective view of the preferred embodiment system shown in-use with the bottle neck seated within the cradle, dispensing the liquid beverage into a typical stemware glass.

FIGS. 23-25, show perspective views of the illuminated beverage dispensing apparatus 10 used as part of a system 200 to support the method of preparing the beverage for consumption. The system includes the illuminated beverage dispensing apparatus 10 along with a decanting vessel 150 and an original beverage container 160. For specific applications the decanter vessel 150 may be replaced, in-use, with a single serving receiving vessel as represented by the stemware glass 170.

As shown in FIG. 23, the system 200 provides a location for the original container 160 to be situated upon base 20 of illuminated beverage dispensing apparatus 10. The base 20 also has a receiving surface for the decanting vessel 150 at a location where it is in a position to receive the decanted and aerated beverage.

FIG. 24 shows system 200 in-use with the neck of the original container bottle 160 placed in the cradle 50 of the illuminated beverage dispensing apparatus 10. The liquid beverage flows from the bottle 160 through removable filter element 90 and onto the flow channel portion 100 where the beverage flows turbulently as it cascades downwardly to the dispensing lip 114 and into the decanting vessel 150. While the beverage is being poured, the neck and shoulder of the original container bottle 160 are illuminated from the bottom portion of the cradle so that a user can detect when sediment begins to flow through the neck. Any sediment that inadvertently passes from the original container bottle 160 is filtered from the beverage by the removable filter element 90.

In a similar fashion, as shown in FIG. 25, system 200 is shown in-use with the neck of the original container bottle 160 placed with the cradle 50 of the illuminated beverage dispensing apparatus 10 for dispensing the liquid to the stemware glass 170. The liquid beverage flows through removable filter element 90 and onto and over the flow channel portion 100 for a cascading turbulent flow to the dispensing lip 114 and into the stemware glass 170, for a single serving pour. Here again, the neck and shoulder of the original container bottle 160 are illuminated from the bottom portion of the cradle so that a user can detect when sediment begins to flow through the neck as the beverage is poured therefrom and thereby allows the user to stop pouring the beverage. Any sediment that inadvertently passes from the original container bottle 160 is filtered from the beverage by the removable filter element 90.

The descriptions above are intended to illustrate possible implementations of the present invention and are not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, functionally equivalent elements or method steps may be substituted for those specifically shown and described, and certain features may be used independently of other features, and in certain cases, particular locations of elements or sequence of method steps may be reversed or interposed, all without departing from the spirit or scope of the invention as defined in the appended Claims. The scope of the claimed invention should therefore be determined with reference to the description above and the appended claims, along with their full range of equivalents.

What is claimed is:

1. A system for dispensing and aerating a beverage, comprising:

an upper housing portion having a cradle configured to retentively engage a neck portion of a beverage container received thereon;

a longitudinally extended support member coupled to said upper housing portion on one end thereof for supporting said upper housing portion at an elevated position; and a flow channel portion removably coupled to said upper housing portion and disposed in aligned relationship with said cradle, said flow channel portion including a downwardly inclined flow channel defining a flow surface disposed in offset manner away from said cradle and the neck portion of the beverage container, said flow surface being formed with a plurality of protuberances extending upwardly therefrom and spaced along a longitudinal flow path of said flow surface to receive and deflectively convey a fluid dispensed from the beverage container received by said cradle, a cascading turbulent flow of the fluid dispensed from the beverage container being thereby generated to provide aeration thereof.

2. The system for dispensing and aerating a beverage as recited in claim 1, where said flow channel portion includes a light-pipe optically coupled to an illumination source disposed in said upper housing portion for illuminating said inclined flow channel.

3. The system for dispensing and aerating a beverage as recited in claim 2, where said light-pipe is defined by a structural rib formed in a lower side of said inclined flow channel and having a portion thereof disposed in aligned optical relationship with said light source.

4. The system for dispensing and aerating a beverage as recited in claim 1, where said flow channel portion is frictionally engaged with said upper housing portion and removable therefrom.

5. The system for dispensing and aerating a beverage as recited in claim 1, where said upper housing portion includes at least one circuit board and sensors coupled thereto for optically detecting a presence of the neck portion of the fluid container and initiating an illumination source positioned in proximity of said cradle to illuminate a flow of the fluid within the neck portion of the beverage container.

6. The system for dispensing and aerating a beverage as recited in claim 1, where said upper housing portion is removably coupled to said longitudinally extended support member.

7. A system for dispensing and aerating a beverage, comprising:

an upper housing portion having a cradle configured for receiving a neck portion of a beverage container;

a longitudinally extended support member coupled to said upper housing portion on one end thereof for supporting said upper housing portion at an elevated position; and a flow channel portion removably coupled to said upper housing portion and disposed in aligned relationship with said cradle, said flow channel portion including a downwardly inclined flow channel defining a flow surface disposed in offset manner away from said cradle and the neck portion of the beverage container, said flow surface being formed with a plurality of protuberances extending upwardly therefrom and spaced along a longitudinal flow path of said flow surface to receive and deflectively convey a fluid dispensed from the beverage container received by said cradle, a cascading turbulent flow of the fluid dispensed from the beverage container being thereby generated to provide aeration thereof;

where said upper housing portion includes an illumination source positioned to illuminate a flow of the fluid within the neck portion of the beverage container to enable a user to detect sediment in the flow.

8. The system for dispensing and aerating a beverage as recited in claim 7, where said illumination source includes a first light source for illuminating the flow of the fluid within the neck portion of the beverage container and a second light source, said flow channel portion includes a light-pipe optically coupled to said second light source disposed in said upper housing portion for illuminating said inclined flow channel.

9. The system for dispensing and aerating a beverage as recited in claim 8, where said light-pipe is defined by a structural rib formed in a lower side of said inclined flow channel and having a portion thereof disposed in aligned optical relationship with said second light source.

10. The system for dispensing and aerating a beverage as recited in claim 7, where said upper housing portion includes at least one circuit board and sensors coupled thereto for optically detecting a presence of the neck portion of the beverage container and initiating said illumination source.

11. The system for dispensing and aerating a beverage as recited in claim 7, where said longitudinally extended support member includes a base portion having at least one depression formed therein configured for receiving one of a beverage container or beverage receiving container therein.

12. A system for dispensing and aerating a beverage, comprising:

a support member extending upwardly from a support base;

an illumination portion coupled to an upper end portion of said support member, said illumination portion including an upper housing portion having a cradle formed therein and configured to retentively engage a neck portion of a beverage container extending longitudinally therein and at least one illumination source disposed within said upper housing portion and positioned for illuminating a flow of the fluid within the neck portion of the beverage container to enable a user to detect sediment in the flow of the fluid; and a flow channel portion removably coupled to said upper housing portion and disposed in aligned relationship with said cradle, said flow channel portion including a downwardly inclined flow channel defining a flow surface disposed in offset manner away from said cradle and the neck portion of the beverage container, said flow surface being formed with a plurality of protuberances extending upwardly therefrom and spaced along a longitudinal flow path of said flow surface to receive and deflectively convey a fluid dispensed from the beverage container received by said cradle, a cascading turbulent flow of the fluid dispensed from the beverage container being thereby generated to provide aeration thereof.

13. The system for dispensing and aerating a beverage as recited in claim 12, where said at least one illumination source includes at least one light emitting diode.

14. The system for dispensing and aerating a beverage as recited in claim 13, where said flow channel portion includes a light-pipe optically coupled to said illumination source for illuminating said inclined flow channel.

15. The system for dispensing and aerating a beverage as recited in claim 14, where said light-pipe is defined by a structural rib formed in a lower side of said inclined flow channel and having a portion thereof disposed in aligned optical relationship with said illumination source.

16. The system for dispensing and aerating a beverage as recited in claim 14, where said at least one illumination source includes a plurality of light emitting diodes, a first portion of said plurality of light emitting diodes illuminating the flow of the fluid within the neck portion of the beverage container and a second portion of said plurality of light emitting diodes illuminating said light-pipe.

17. The system for dispensing and aerating a beverage as recited in claim 12, where said at least one illumination source includes a lens for focusing light emitted therefrom in a longitudinally extended beam directed through the neck portion of the beverage container.

18. The system for dispensing and aerating a beverage as recited in claim 12, where said illumination portion includes at least one circuit board and sensors coupled thereto for optically detecting a presence of the neck portion of the beverage container and initiating said illumination source to illuminate the flow of the fluid within the neck portion of the beverage container.

19. The system for dispensing and aerating a beverage as recited in claim 12, where said flow channel portion includes a removable filter disposed at an upstream portion of said downwardly inclined flow channel.

* * * * *